US009542431B2

(12) United States Patent
Prabhakaran et al.

(10) Patent No.: US 9,542,431 B2
(45) Date of Patent: Jan. 10, 2017

(54) CYCLIC COMMIT TRANSACTION PROTOCOL

(75) Inventors: Vijayan Prabhakaran, Sunnyvale, CA (US); Lidong Zhou, Cupertino, CA (US); Thomas Lee Rodeheffer, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 12/257,785

(22) Filed: Oct. 24, 2008

(65) Prior Publication Data

US 2010/0106753 A1  Apr. 29, 2010

(51) Int. Cl.
*G06F 17/30* (2006.01)

(52) U.S. Cl.
CPC .............................. *G06F 17/30371* (2013.01)

(58) Field of Classification Search
CPC .................................................. G06F 17/30371
USPC ........................................... 707/674, 999.206
See application file for complete search history.

(56) References Cited

U.S. PATENT DOCUMENTS

| | | | |
|---|---|---|---|
| 5,333,303 A | | 7/1994 | Mohan |
| 5,369,757 A | | 11/1994 | Spiro et al. |
| 5,465,328 A | * | 11/1995 | Dievendorff et al. .......... 714/15 |
| 7,418,463 B2 | | 8/2008 | Verma et al. |
| 2005/0187983 A1 | | 8/2005 | Narang et al. |
| 2005/0216653 A1 | * | 9/2005 | Aasheim et al. ............. 711/103 |
| 2005/0235119 A1 | * | 10/2005 | Sechrest et al. ............. 711/158 |
| 2006/0239075 A1 | * | 10/2006 | Williams et al. ........ 365/185.17 |
| 2007/0005627 A1 | * | 1/2007 | Dodge .......................... 707/101 |
| 2007/0005874 A1 | * | 1/2007 | Dodge .......................... 711/103 |
| 2007/0113120 A1 | * | 5/2007 | Dodge .......................... 714/703 |
| 2007/0245128 A1 | * | 10/2007 | Gray et al. .................... 712/214 |
| 2008/0021934 A1 | | 1/2008 | Hudson et al. |
| 2008/0046443 A1 | * | 2/2008 | Fachan et al. ................ 707/100 |
| 2008/0098157 A1 | * | 4/2008 | Andrewartha et al. ....... 711/103 |
| 2009/0019209 A1 | * | 1/2009 | Shen et al. .................... 711/100 |
| 2009/0055578 A1 | * | 2/2009 | Lee et al. ...................... 711/103 |
| 2009/0271563 A1 | * | 10/2009 | Gopalan et al. ............. 711/103 |
| 2009/0276586 A1 | * | 11/2009 | Royer et al. .................. 711/154 |
| 2009/0287874 A1 | * | 11/2009 | Rogers et al. ................ 711/103 |
| 2011/0191522 A1 | * | 8/2011 | Condict et al. ............... 711/103 |

FOREIGN PATENT DOCUMENTS

EP        1510924 A1    3/2005

OTHER PUBLICATIONS

Article entitled "Cyclic Commit Protocol Specifications", dated Sep. 11, 2008.*
Article entitled "Atomic Recovery Units: Failure Atomicity for Logical Discs" by Grimm et al. dated May 1996.*

(Continued)

*Primary Examiner* — Mahesh Dwivedi
(74) *Attorney, Agent, or Firm* — Aneesh Ashish Mehta; Kate Drakos; Micky Minhas

(57) ABSTRACT

A cyclic commit protocol is used to store relationships between transactions and is used by the technology to determine whether a transaction is committed or not. The protocol allows creation of a cycle of transactions which can be used to recover the state of a storage device after a host failure by identifying the last committed version of intention records as committed or uncommitted based on the data stored in the physical pages.

20 Claims, 23 Drawing Sheets

(56) References Cited

OTHER PUBLICATIONS

Article entitled "Stasis: Flexible Transactional Storage" by Sears et al. dated 2006.*
Article entitled "Transactional Flash", by Prabhakaran et al., Dated Dec. 8, 2008.*
Article entitled "TransFlash", by Harris, dated Jan. 17, 2009.*
Article entitled "Transactional Flash Slides", by Prabhakaran et al., (no date).*
Article entitled "Transactional Flash", by Prabhakaran et al, dated 2008.*
Article entitled "8$^{th}$ USENIX Symposium on Operating Systems Design and Implementation (OSDI '08)", by USENIX, dated Jul. 18, 2008.*
Article entitled "Cyclic Linked Lists and Racing Pointers", dated Jul. 26, 2007, by Dominic.*
Article entitled "Flag Commit: Supporting Efficient Transaction Recovery in Flash Based DBMSs", by On et al., dated Sep. 2012.*
Prabhakaran, Vijayan, et al., "Transactional Flash," 8th USENIX Symposium on Operating Systems Design and Implementation, Dec. 2008, pp. 147-160.
Agrawal, N., et al., "Design Tradeoffs for SSD Performance," Proceedings of the USENIX Annual Technical Conference (USENIX '08), Jun. 2008, pp. 57-70.
Bernstein, D.J., "Using maildir format," [http://cry.y.to/proto/maildir.html], downloaded on Aug. 15, 2014, 2 pages.
Bucy, J.S., et al., "The DiskSim Simulation Environment," Version 3.0, Reference Manual, Technical Report CMU-CS-03-102, Carnegie Mellon University, Jan. 2003, 65 pages.
Chao, C., et al., "Mime: a high performance parallel storage device with strong recovery guarantees," Technical Report HPL-CSP-92-9rev1, HP Laboratories, Nov. 1992, 20 pages.
De Jonge, W., et al., "The Logical Disk: A New Approach to Improving File Systems," Proceedings of the 14th ACM Symposium on Operating Systems Principles (SOSP '93), pp. 15-28, Dec. 1993.
Dewitt, D.J., et al., "Implementation Techniques for Main Memory Database Systems," Computer Sciences Technical Report #529, Jun. 1984.
Gal, E., et al., "A Transactional Flash File System for Microcontrollers," Proceedings of the USENIX Annual Technical Conference (USENIX '05), pp. 89-104, Apr. 2005.
Grimm, R., et al., "Atomic Recovery Units: Failure Atomicity for Logical Disks," International Conference on Distributed Computing Systems (ICDCS '96), pp. 26-37, May 1996.
Lamport, L., "Specifying Systems," The TLA+ Language and Tools for Hardware and Software Engineers, Addison-Wesley, Jun. 18, 2002, 382 pages.
Lowell, D., et al., "Free transactions with Rio Vista," Proceedings of the 16th ACM Symposium on Operating Systems Principles (SOSP '97), pp. 92-101, Oct. 1997.
Mohan, C., et al., "Aries: a transaction recovery method supporting fine-granularity locking and partial rollbacks using write-ahead logging," ACM Transactions on Database Systems,17(1), pp. 94-162, Mar. 1992.
Norcutt, W., "The IOzone Filesystem Benchmark," [http://www.iozone.org], downloaded on Aug. 15, 2014, 18 pages.
Park, S., et al., "Atomic Write FTL for Robust Flash File System," Proceedings of the Ninth International Symposium on Consumer Electronics, pp. 155-160, Jun. 2005.
Prabhakaran, V., et al., "IRON File Systems," Proceedings of the 20th ACM Symposium on Operating Systems Principles, pp. 206-220, Oct. 2005.
Red Hat Corporation, "JFFS2: The Journalling Flash File System," [http://sources.redhat.com/jffs2/jffs2.pdf], downloaded on Aug. 15, 2014, 12 pages, 2001.
Reed, D.P., "Naming and Synchronization in a Decentralized Computer System," Ph.D. Dissertation, Massachusetts Institute of Technology, Cambridge, MA, USA, Sep. 1978, 187 pages.
Rodeheffer, T.L., "Cyclic Commit Protocol Specifications," Technical Report MSR-TR-2008-125, Microsoft Research, Sep. 2008, [ftp://ftp.research.microsoft.com/pub/tr/TR-2008-125.pdf], 32 pages.
Rosenblum, M. et al., "The Design and Implementation of a Log-Structured File System," ACM Transactions on Computer Systems, 10(1): pp. 26-52, Feb. 1992.
Samsung Corporation, K9XXG08XXM Flash Memory Specification, [http://www.samsung.com/global/system/business/semiconductor/product/2007/6/11/NANDFlash/SLC_LargeBlock/8Gbit/K9F8G08U0M/ds_k9f8g08x0m_rev.10.pdf], 2007.
Sears, R., et al., "Stasis: flexible transactional storage," Proceedings of the 7th symposium on Operating systems design and implementation, pp. 29-44, Nov. 2006.
Seltzer, M., "File System Performance and Transaction Support," PhD thesis, EECS Department, University of California, Berkeley, 1992, 131 pages.
Seltzer, M., et al., "An Implementation of a Log-Structured File System for UNIX," Proceedings of the USENIX Winter Technical Conference (USENIX Winter '93), pp. 307-326, May 1998.
Sweeney, A., et al., "Scalability in the XFS File System," Proceedings of the USENIX Annual Technical Conference, pp. 1-14, Jan. 1996.
Transaction Processing Council, TPC Benchmark B Standard Specification, Revision 2.0, Jun. 7, 1994.
Tweedie, S.C., "Journaling the Linux ext2fs File System," The Fourth Annual Linux Expo, Durham, North Carolina, May 1998, 8 pages.
Yang, J., et al., "EXPLODE: A Lightweight, General System for Finding Serious Storage System Errors," Proceedings of the 7th Symposium on Operating Systems Design and Implementation, pp. 131-146, Nov. 2006.
Yang, J., et al., "Using Model Checking to Find Serious File System Errors," Proceedings of the 6th Symposium on Operating Systems Design and Implementation, pp. 273-288, Dec. 2004.
Atomicity and Durability, Power Point, 19 pages, isis.ku.dk/kurser/blob.aspx?feltid=47191.
Chin-Hsien Wu, Efficient Initialization and Crash Recovery for Log-based File Systems Over Flash Memory, Symposium on Applied Computing Proceedings of the 2006 ACM symposium on Applied computing, Apr. 23-27, 2006, pp. 896-900, ACM, New York, NY, USA.
Recovery Algorithms, CS 2550/Spring 2006, Principles of Database Systems, Power Point, http://db.cs.pitt.edu/courses/cs2550/spring2006/slides/14.recovery-algos.4pp.pdf.

* cited by examiner

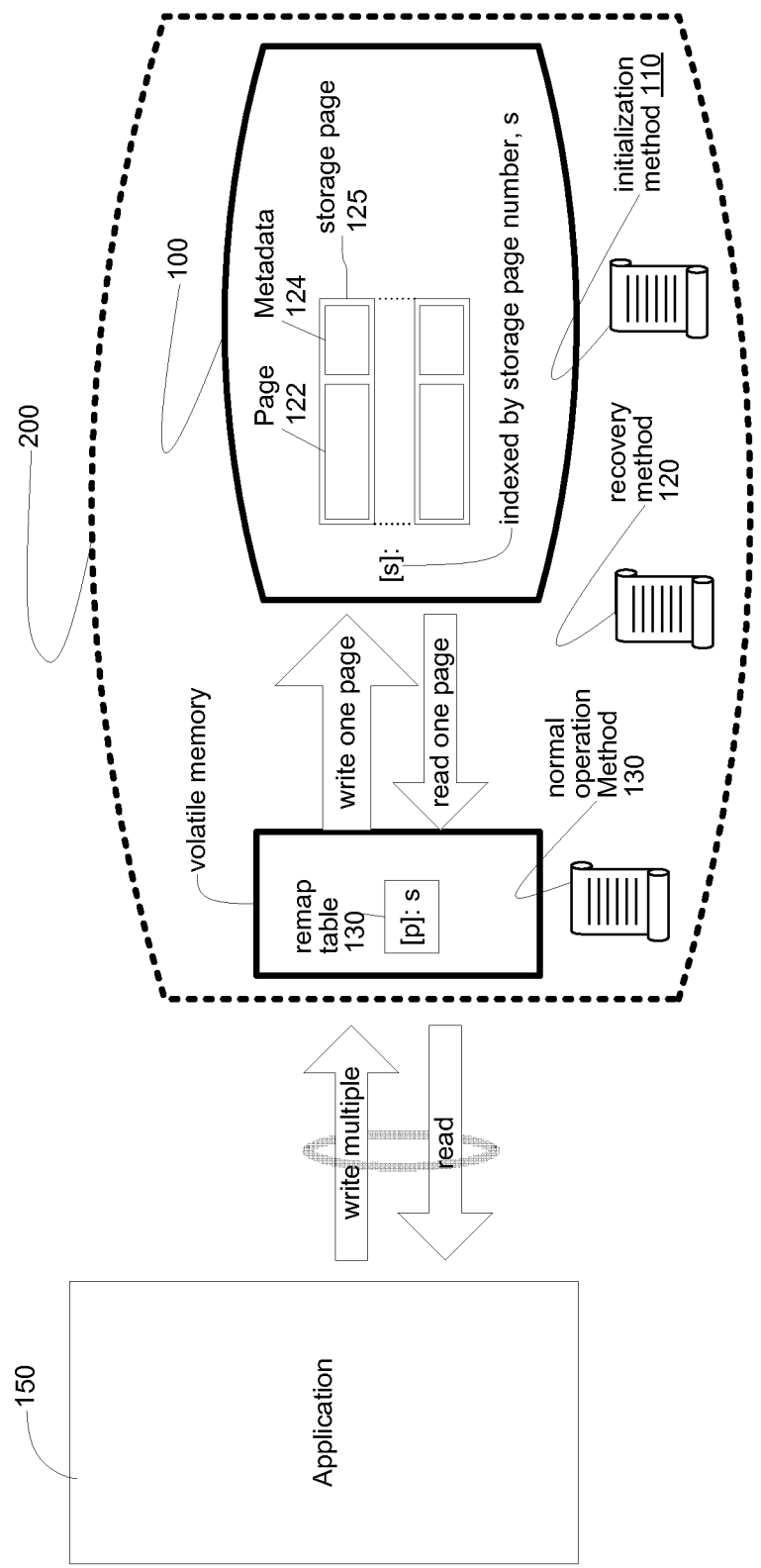

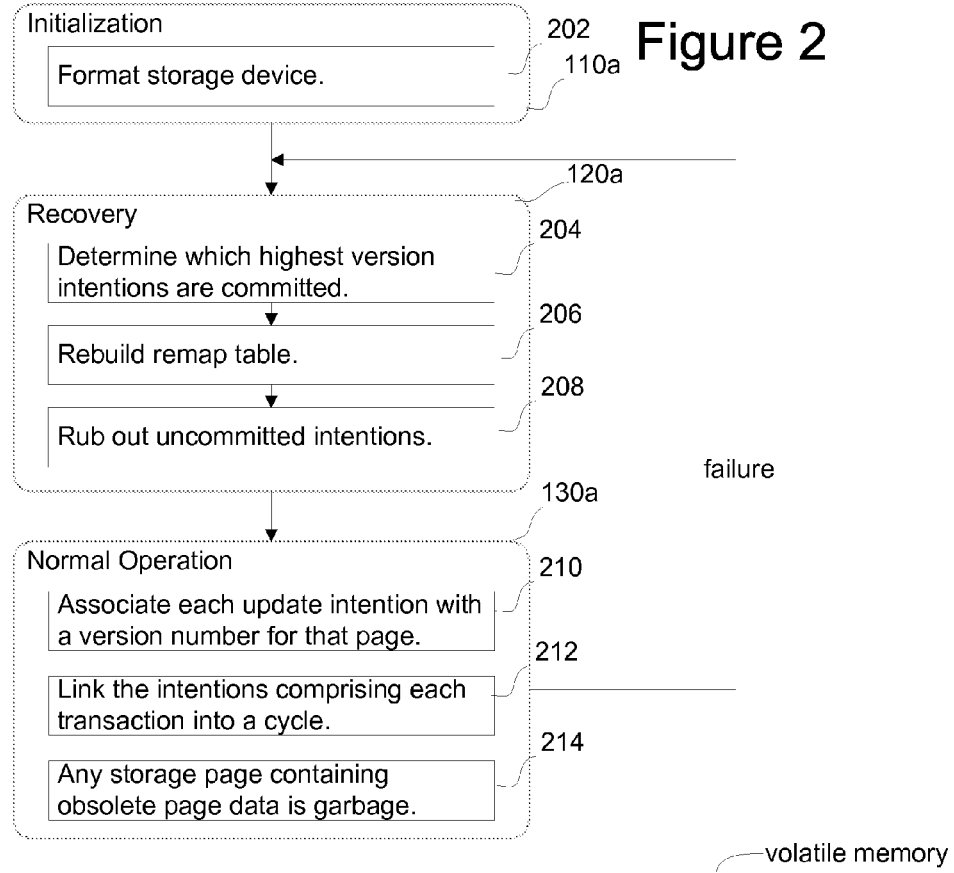
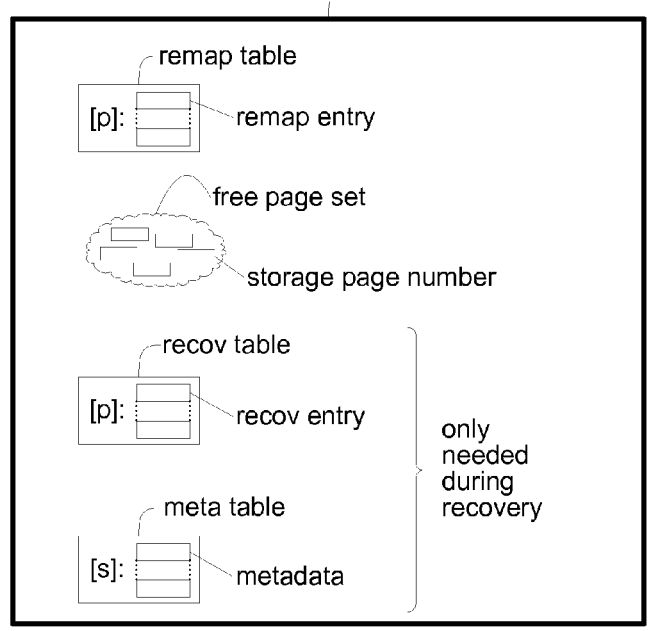

Figure 4
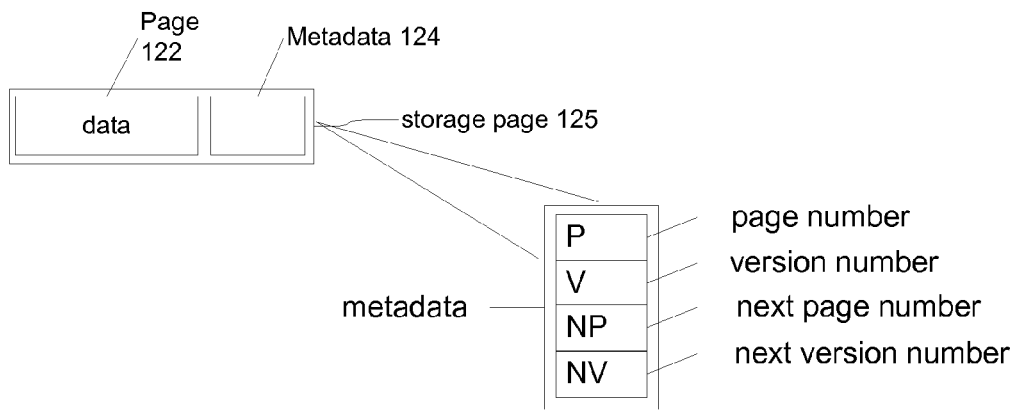
Figure 5
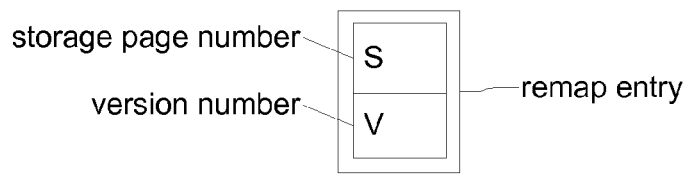
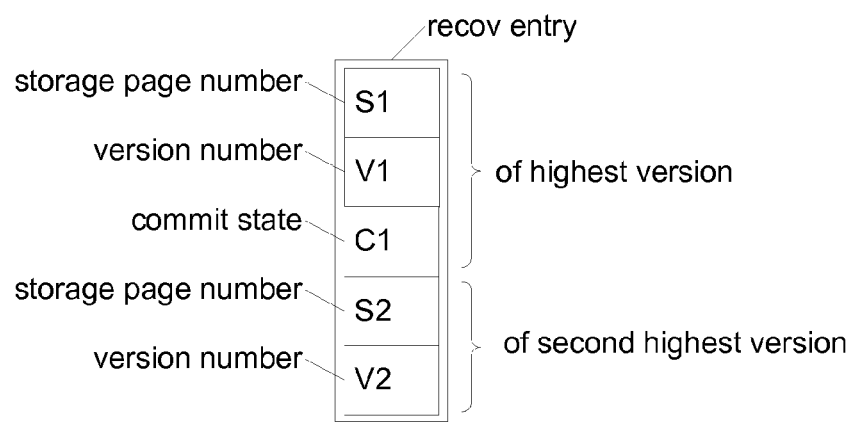
Figure 6

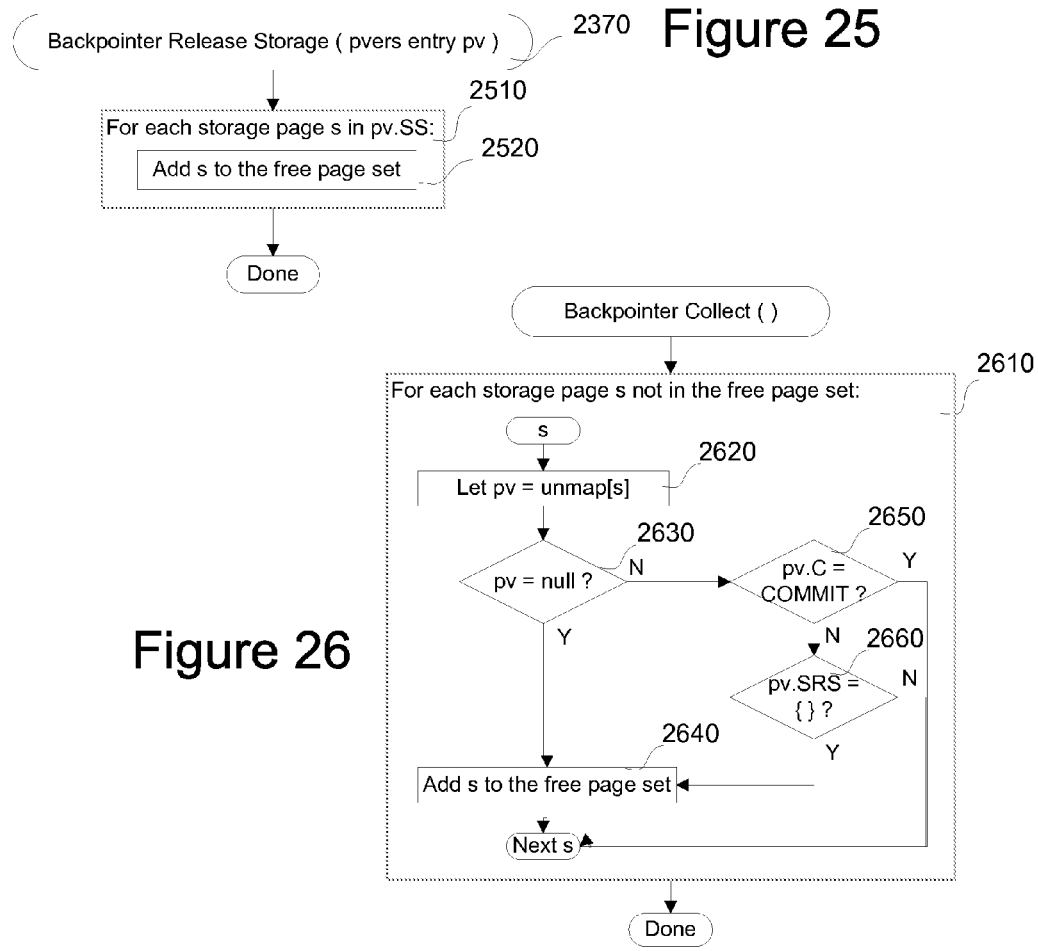
Figure 25
Figure 26
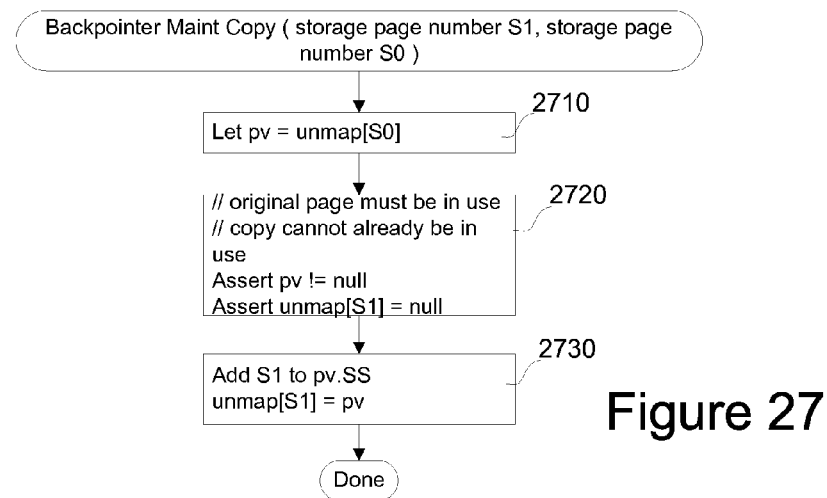
Figure 27

CYCLIC COMMIT TRANSACTION PROTOCOL

BACKGROUND

Non-volatile random access storage devices store data in pages that can be read or written as commanded by a host system's application. These storage devices provide non-volatile memory that persists across system failures such as a power failure in the host device.

Often an application needs to update multiple pages of data as part of a single compound operation. A failure during a write operation may leave such a compound operation only partially completed. When the application is restarted it needs to recover a consistent state.

FIG. 1 illustrates a general approach to implementing a transactional storage device 200. An application 150 addressing the device is permitted to issue operations to write multiple pages and to read single pages. Each operation is considered a transaction. The application does not issue overlapping operations on the same page, while the transactional storage device ensures that every operation will either complete fully or, if interrupted, appear never to have been started.

A transactional storage device 200 may be implemented using a combination of data structures stored in volatile memory, data structures stored on in non-volatile memory 100, and methods for updating the data structures by reading and writing individual pages on the storage device during normal operation, recovery, and initialization. The initialization method 110 formats the data structures on the ordinary storage device when the transactional storage device is first placed into service. The recovery method 120 rebuilds the data structures in volatile memory and possibly repairs some storage pages on the storage device before resuming normal operation after a failure or other stoppage.

As illustrated in FIG. 1, a storage page 125 includes metadata 124 in addition to the page data 122. The metadata is typically used to store an identification label and an error correction code for the data and metadata in the storage page. Common sizes for typical storage devices are 512 to 4096 bytes of page data and 8 to 128 bytes of metadata.

Transactional write operations may be implemented by means of a remap table 130 and a log of intentions and commits. When writing new data to a page, the old data is never overwritten because a failure might cause both the old data and the new data of the page to be lost. Instead, the new data is written to a free storage page 125 with metadata 124 indicating the page number and a version number. The version number serves to identify which version of the page is most recent. A remap table 130 in volatile memory keeps track of the latest storage page and version number for each page. To handle transactional write operations of multiple pages, the new data for each page is written to the storage device as an intention record. Once all the writes of intention records have completed successfully, a commit record is written to the storage device. Typically the intention records and commit records are organized into a log.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Technology is presented for writing information to a storage medium which allows for the efficient recovery of the medium if the write operation is interrupted. A cyclic commit protocol is used to store relationships between transactions and is used by the technology to determine whether a transaction is committed or not. The cyclic commit protocol stores a link to the next record in the metadata of an intention record and creates a cycle among the intention records of the same transaction. In an alternate embodiment, the protocol stores a link to the next record and the last known committed intention in the metadata.

In one aspect, a method for storing information on a non-volatile storage media is described. The method includes defining a series of write operations in a transaction, each write operation including a write intention. The method includes writing data in the write operations in a series of storage pages, each page including metadata identifying at least one other intention in the transaction cycle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates a general approach to implementing a transactional storage device.

FIG. 2 illustrates the overall method according to the first embodiment of the recovery method of the technology.

FIG. 3 illustrates the volatile memory data structures.

FIG. 4 illustrates metadata fields stored with each page in a first embodiment of the technology.

FIG. 5 illustrates the fields in a remap table entry according to a one embodiment of the technology.

FIG. 6 illustrates the fields in a recov entry.

FIG. 25 is a flowchart illustrating the method to release storage from a version.

FIG. 26 is a flowchart illustrating a method of returning storage pages to the free page set.

FIG. 27 is a flowchart illustrating a method of maintaining the volatile data structures when a storage page is copied.

DETAILED DESCRIPTION

Figure 7:
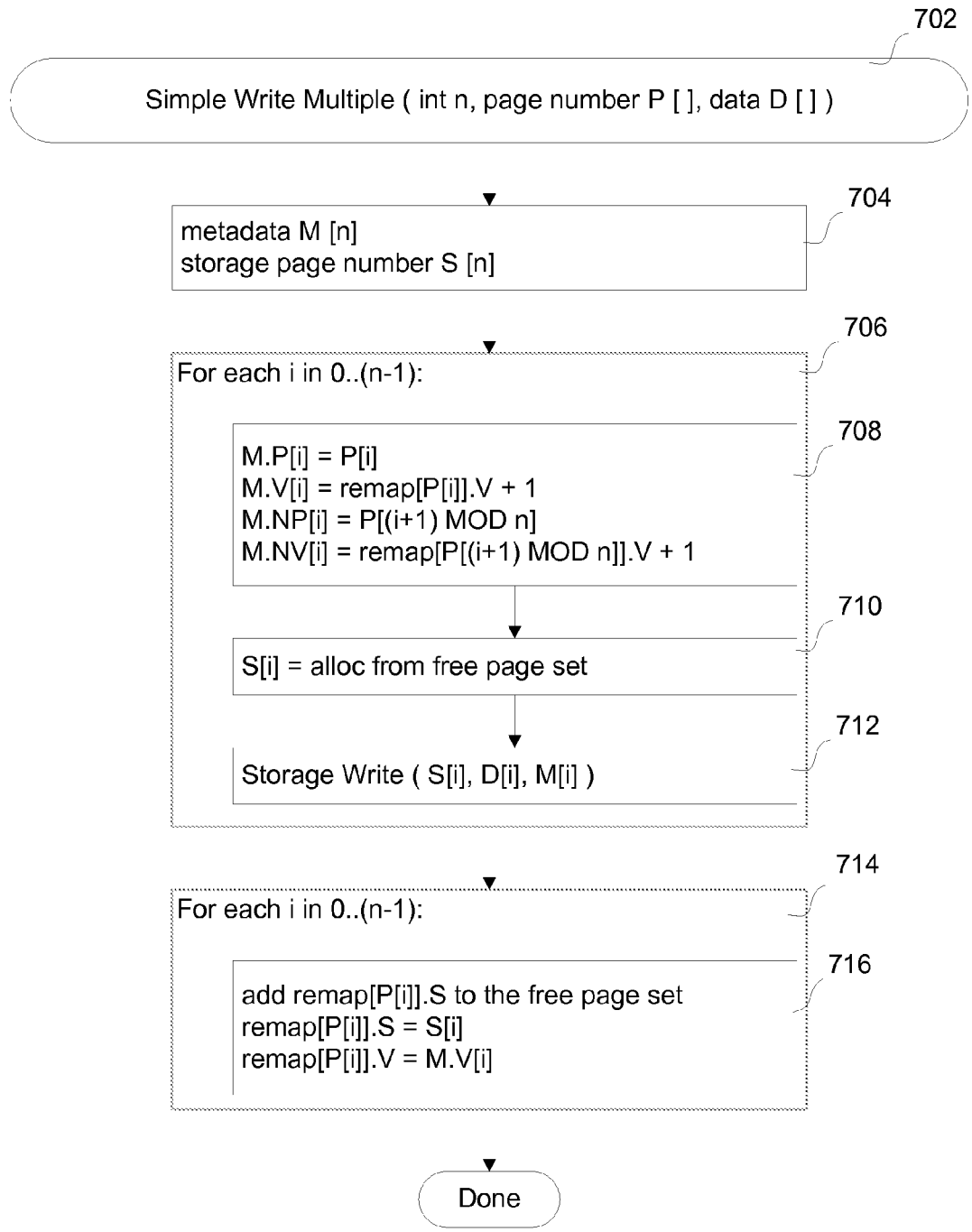
FIG. 7 is a flowchart showing a method of writing multiple pages in a transaction according to the first embodiment of the technology.

Technology is presented for efficiently ensuring that the integrity of data operations on a non-volatile storage device which have been interrupted due to a host system failure is maintained. A cyclic commit protocol is used to store relationships between transactions and is used by the technology to determine whether a transaction is committed or not.

In a unique aspect of the present technology, instead of using commit records to determine whether a transaction is committed or not, a cyclic commit protocol stores a link to the next record in the metadata of an intention record (i.e., the logical page of an SSD) and creates a cycle among the intention records of the same transaction. This eliminates the need for a separate commit record for each transaction, thereby removing the space and performance overheads.

As discussed below, the next page and version numbers are stored in the metadata portion of a page as a next-link. For each transaction, the next-link information is added to the intention records before they are concurrently written. The transaction is committed once all the intention records are written. If committed, starting with any intention record, a cycle that contains all the intention records in the transaction can be found by following the next-links. Any intention record belonging to an incomplete transaction is considered uncommitted. In the event of a system failure, a recovery procedure starts by scanning the physical pages and then runs a recovery algorithm to classify the intention records as committed or uncommitted, and identify the last committed version for each page based on the metadata stored in the physical pages Two implementations are described. A first implementation requires that the recovery method rub out uncommitted storage pages before the system may resume normal operation. A second implementation requires additional metadata to be kept in each storage page and an analysis of the transactions is performed. The second alternative also requires that storage pages containing obsolete page data be reclaimed according to a certain precedence order, whereas the simple alternative has no such requirement. Neither alternative requires any reorganization overhead for garbage collection.

In a first alternative, sometimes referred to herein as a "simple" alternative, an assumption is made that after a host system failure, all intentions stored on the storage device are committed intentions except for intentions that belong to a transaction currently in progress. Since applications do not issue overlapping operations for the same page, the first implementation chooses between the intentions having the highest and the second highest version numbers for each page. Based on the assumption that all intentions are committed intentions except those in a transaction currently in progress, the intentions having the second highest version numbers must have been committed, since the application must have completed their transactions before going on to start a subsequent transaction on the same page. The method must then determine which of the highest version number intentions are also committed. After this has been done, all uncommitted intentions are rubbed out, restoring the invariant before resuming normal operation.

FIG. 2 illustrates the overall method according to the first embodiment of the recovery method of the technology. There are three main methods: initialization, recovery, and normal operation.

In normal operation at 130a, each time a page is updated an associated version number is incremented at step 210. The page and version number is included in the intention record so that the recovery method can order in time multiple intentions relating to the same page. An intention record is stored in a storage page using page data and metadata. A remap table relates each page to the storage page number and version number of its latest version.

Alternatively, instead of associating a version number with each page, a transaction number can be associated with each transaction and this transaction number can be used in all places where the described embodiment uses a version number. The necessary adaptations will be obvious to those skilled in the art. A disadvantage of the transaction number alternative is that arriving write multiple operations have to be serialized, however briefly, in order to assign them each a transaction number.

At step 212, in a unique aspect of the present technology, all of the intentions belonging to the same transaction are linked together into a cycle by including in each intention the page number and version number of the next intention in the cycle. The cycle structure creates an implicit commit protocol, because the recovery method can determine that all intentions were written by tracing the links and finding a complete cycle.

At step 214, any storage page that contains obsolete page data is garbage and may be reclaimed and reused. Obsolete page data refers to the fact that there is a subsequent committed intention for the same page When a transactional storage device is first brought into service, it needs to be initialized so that the data structures on permanent storage can reasonably be interpreted by the recovery method. At step 202, the drive is formatted by writing a single transaction for each page, using version number zero and filling the page data with zeroes. Any surplus storage pages may be filled with copies of the earlier storage pages or rubbed out or otherwise erased.

After initialization, a recovery method 120a is used to prepare for normal operation. The purpose of the recovery method 120a is to rebuild volatile data structures and possibly repair permanent data structures in preparation for normal operation.

As noted above, of the assumption that all intentions on the storage device are committed intentions except for intentions that belong to a transaction currently in progress, the recovery method only has to choose between the intentions having the highest and the second highest version numbers for each page. The intentions having the second highest version numbers must have been committed, since the application must have completed their transactions before going on to start a subsequent transaction on the same page.

Hence, the recovery method determines which of the highest version number intentions are also committed. At step 204, given a highest version number intention A, the recovery method determines whether A is committed or uncommitted using values available as stored in A's intention record via the following analysis:

If NP and NV are the page and version number of the next intention in the cycle from A, and HV is the highest version number of any intention that exists on the storage device for page NP, then there are three possible cases:

1. If HV>NV, then intention A is a committed intention. The application started a subsequent transaction on page NP so it must have completed the one involving A.
2. If HV<NV, then intention A is an uncommitted intention. The transaction involving A could not have completed, because if it had, there would be an intention on page NP with a version number at least as high as NV.
3. If HV=NV, then intention A links to another highest version number intention B, and the answer is the same as for intention B, which may be determined recursively. If this results in a cycle, then all of the involved intentions are committed intentions.

At step 204, for each page, the recovery method identifies the last committed intention based on this analysis. At step 206, the storage page and version number of the last committed intention are stored in the remap entry for the corresponding page.

Having determined which intentions were committed, at step 208, the recovery method rubs out any uncommitted intentions. This step is restores the invariant that all intentions on the storage device are committed intentions except for intentions that belong to a transaction currently in progress. Note that to rub out an intention, all copies of it must be eliminated from the storage device.

FIG. 3 illustrates the volatile memory data structures. In one embodiment, the data structures are stored in the high speed memory of a host device. The volatile data structures may consist of a remap table, a free page set, a recov table, and a meta table. The remap table relates each page number to the storage page and version number of the last committed intention. The free page set contains storage page numbers of free storage pages on the storage device. The recov table and the meta table contain information used during recovery and need not be stored at other times. The recov table is indexed by page number. The meta table is indexed by storage page number and contains a copy of the metadata for each storage page on the storage device.

FIG. 4 illustrates additional metadata fields stored with each page in a first embodiment of the technology. These additional metadata fields include the page and version number and the next page and next version number. Fields P and V contain the page number and version number of the intention. Fields NP and NV contain the page number and version number of the next intention in the cycle of intentions of the current transaction. Typically the metadata in a storage page would also include error correction code to ensure the integrity of the data and the metadata.

In the following description, the detection of a rubbed-out or erased storage page during a storage read operation is modeled as reading a value of NOPAGE for the metadata page number field.

FIG. 5 illustrates the fields in a remap table entry according to a one embodiment of the technology. Field S contains the storage page number in which the current version of the page is stored. Field V contains the version number.

FIG. 6 illustrates the fields in a recov entry. There are two groups of fields which correspond to the intentions having the highest and the second highest version numbers for the corresponding page. Fields S1 and V1 contain the storage page number and version number of the highest numbered version. Fields S2 and V2 contain the storage page number and version number of the second highest numbered version. Field C1 contains the deduced commitment state of the intention having the highest version number. The commitment state is one of NONE, UNCOMMIT, COMMIT. NONE means that the commitment state has not yet been deduced. UNCOMMIT means that the intention is known to be uncommitted. COMMIT means that the intention is known to be committed.

A method of reading the current contents of page number P involves looking up the current storage page number in the remap array and then reading that storage page from the storage device. The necessary arrangements will be obvious to those skilled in the art.

In order to maintain data integrity, a new protocol for writing transactions for pages of memory is provided. The protocol allows for the recovery of operations in progress during a host failure.

FIG. 7 is a flowchart showing a method of writing multiple pages in a transaction according to the first embodiment of the technology. At step 704, metadata is constructed for the intentions to be written, arranging for the NP and NV fields in each intention to refer to the next intention in cyclic order. The cycle is constructed in the order in which the pages are presented. Alternatively the cycle may be constructed in any other cyclic order.

For each page at step 706, steps 708, 710 and 712 are repeated. At step 708 the remap table is consulted to determine the last committed version, and the intention is written for the next version. That is, for each metadata entry P, V, NP and NV for page I, the remap data provides the last committed version and the next committed version written base on that version. At step 710, a free storage page (S[i]) is obtained from the free page set and then the page data D[i], and metadata M[i] of the intention are written to the storage device.

After all the writes are complete, at step 716 the old storage pages are returned to the free page set and the remap table is updated to refer to the new storage pages and new last committed versions.

As will be obvious to those skilled in the art, the storage pages for the transaction may be written in any sequence and overlapped in time. If the storage device requires storage pages to be erased before they may be rewritten, this must be performed before the storage pages are allocated to another write operation. Prior art teaches methods for doing this and the necessary arrangements will be obvious to those skilled in the art.

In the method shown in FIG. 7, the pages to be written in the transaction are presented all at once. Alternatively, the pages could be presented in a sequence, without indicating in advance how many there would be, and the method could determine the metadata for each intention as soon as it knew the next page number or, finally, that there were to be no more pages.

Note that writing a single page in a transaction is merely a simple instance of writing multiple pages in a transaction.

Figure 8:
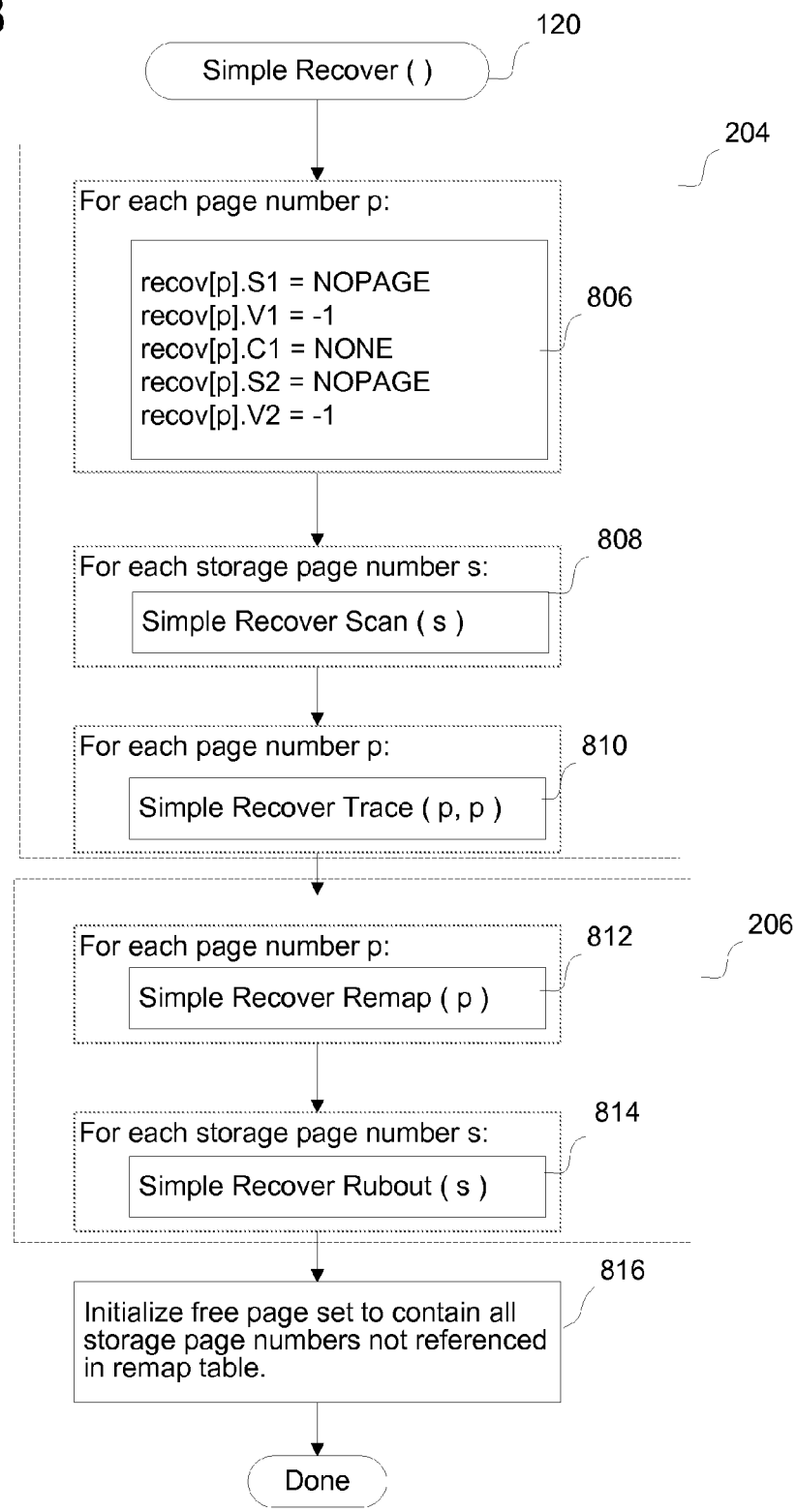
FIG. 8 is a flowchart of the recovery method illustrating additional steps completed.

FIG. 8 is a flowchart of the recovery method illustrating additional steps completed at steps 204 and 206. In general, the recovery method comprises: initializing the recov table, scanning the metadata of all storage pages, tracing cycle links for the highest version intention of each page, constructing the remap table, rubbing out storage pages that contain uncommitted intentions, and initializing the free page set. These steps are meant to be illustrative and the actions described may be reordered and recombined as will be obvious to those skilled in the art.

At step 806, the recovery table is initialized. For each page P, initial recov values for S1, V1, C1 S2 and V2 are set. At step 808, for each storage page s, a recover scan is performed. The recover scan is detailed in FIG. 9. At step 810, a recover trace is performed for each page P. The recover trace is detailed in FIG. 10. At step 812, for each page—a recover remapping occurs as detailed in FIG. 11. At step 814, a recover rubout occurs as detailed in FIG. 12, below. At step 816, the free page set is initialized to contain all storage page numbers not referenced in the remap table.

Figure 9:
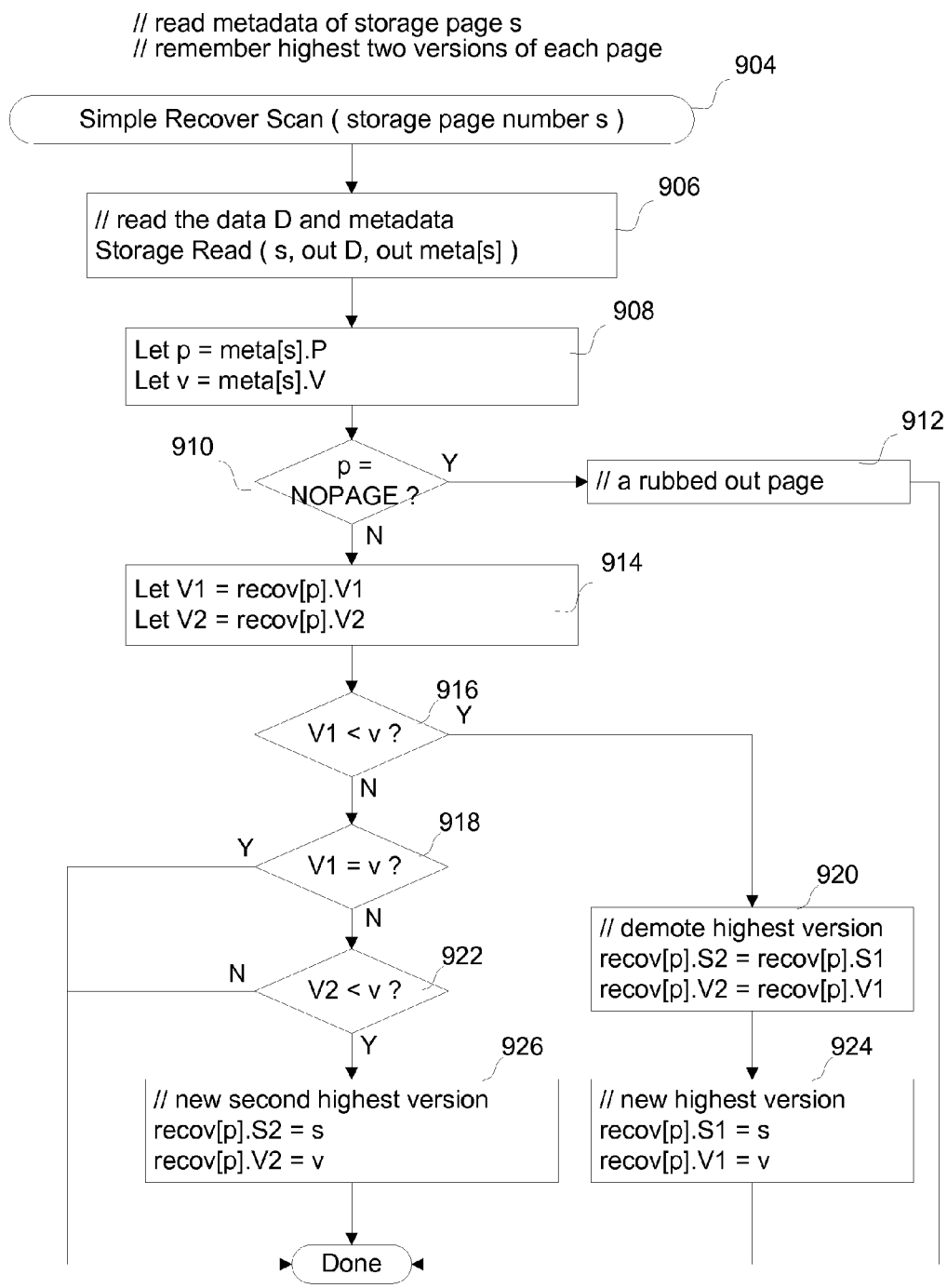
FIG. 9 is a flowchart showing the recovery subroutine to scan a storage page.

FIG. 9 is a flowchart showing the recovery subroutine (step 808 in FIG. 8) to scan a storage page. At step 906, a storage page is read from the storage device and its metadata saved. At step 908, the metadata is interpreted as an intention and related to the recov entry for the relevant page. At step 910, a determination is made as to whether the metadata page (p) under determination is a rubbed out page. If so, at step 912, the method is complete. If not, then at step 914, the page version and previous versions are set the recov values and at step 916, a determination of whether the version information for the highest version (V1) is less than the stored page version number (v). If so, the highest version is demoted by mapping the recov values for the storage page number and the version number to the second highest version and storage page numbers (V2, S2), respectively at step 920. A new highest version and stored page number are set at 924. If not, then a determination is made at step 918 whether the highest version of the page V1 is equal to the stored page version number. If so, the routine is complete. If not, at step 922, a determination is made as to whether the second highest version V2 is less than the stored version (v) and if so, then a new second highest version is set at step 926. Information about the highest and second highest numbered intention for the page is retained. A duplicate copy of the same intention as seen previously is detected and ignored.

Figure 10:
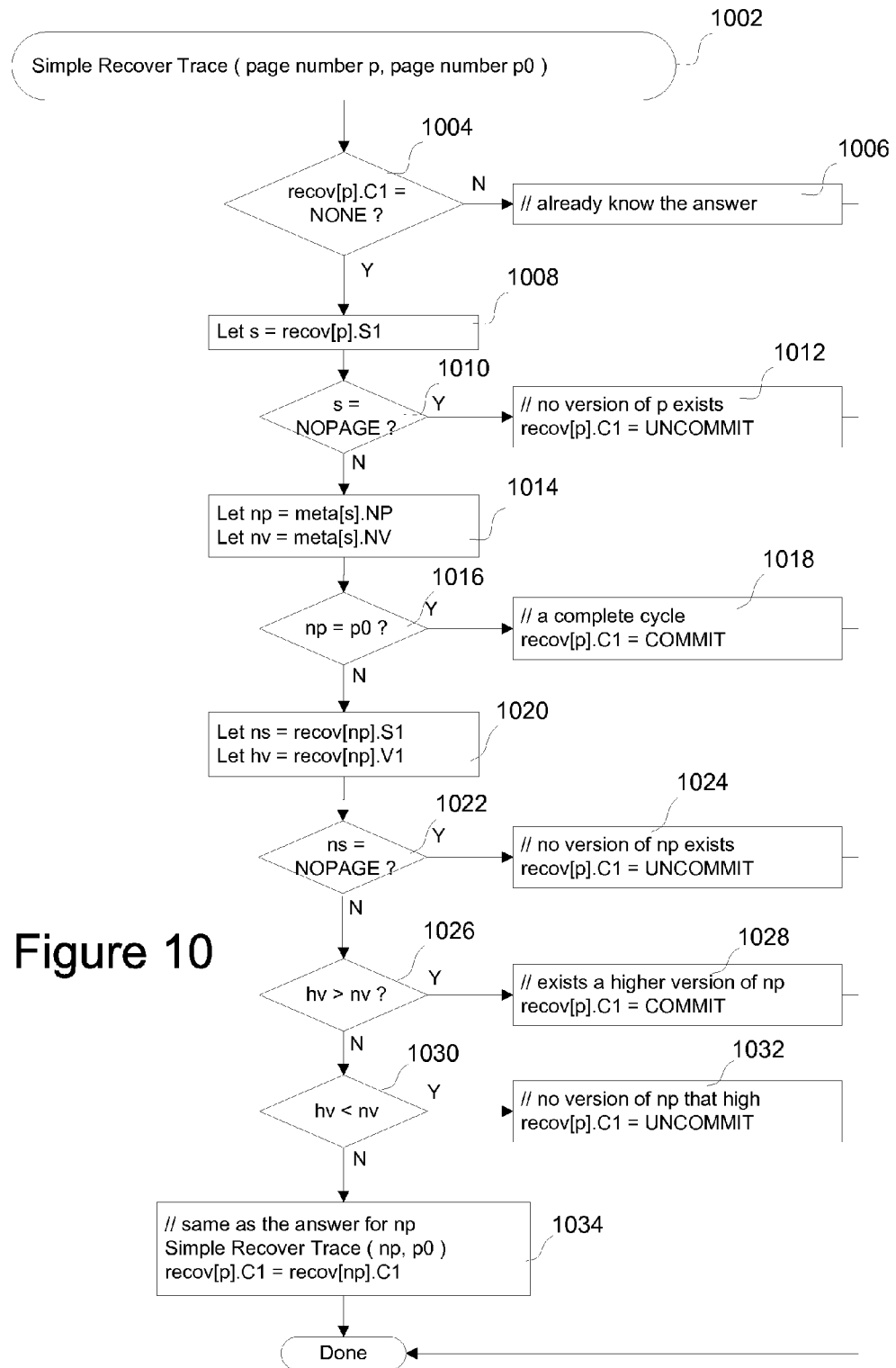
FIG. 10 is a flowchart of the recovery subroutine to trace cycle links to determine if the highest version of page p is committed.

FIG. 10 is a flowchart of the recovery subroutine to trace cycle links to determine if the highest version of page p is committed. The subroutine is applied recursively in case the highest version intention links to another highest version intention. The p0 parameter indicates the outer level page in the recursive stack and is used to detect a cycle. The subroutine uses the recov table to locate the storage page containing the highest number intention and then the meta table to access the cycle link. Then it uses the recov table again to determine the highest version number for the linked page. The answer is immediate when the highest version differs from the next version. Otherwise the answer is determined recursively.

At step 1004, if the commit state C1 in the remap entry for page P is note NONE, then the answer is known. If the commit state is NONE, then at step 1008, the storage page number is set to the recov page number S1. At step 1010 if the storage page number determines the page was rubbed out, then C1 is set to uncommitted at 1012. If the page has not been rubbed out at 1010, then at step 1014, the metadata next page and next version numbers are set as test variables and at step 1016 if the next page number is equal to p0, the outer page in the recursive stack, then the recov entry commit state is set to COMMIT as the cycle is complete. If the next page is not equal to p0 at step 1016, then at step 1020 the recov storage page number and the recov version number are set as variables. At step 1022, a test is made to determine if the storage page number has been rubbed out and if so, at step 1024, the recov entry for the commit state is set to UNCOMMIT as no version of the page exists. If not, then at step 1026, a determination is made as to whether the recov version number is greater than the next version number. If so, a higher version of the page exists and the commit state in the recov table is set to COMMIT at 1028. If not, then a determination is made as to whether the recov version number is less than the next version number and if so, the commit state of the recov entry is set to UNCOMMIT since no version of the page exists. If not, then the Simple recover trace method is performed recursively for the next page.

Alternatively, the subroutine for tracing cycle links can be organized as an iterative loop instead of a recursive loop. The necessary arrangements will be obvious to those skilled in the art.

Figure 11:
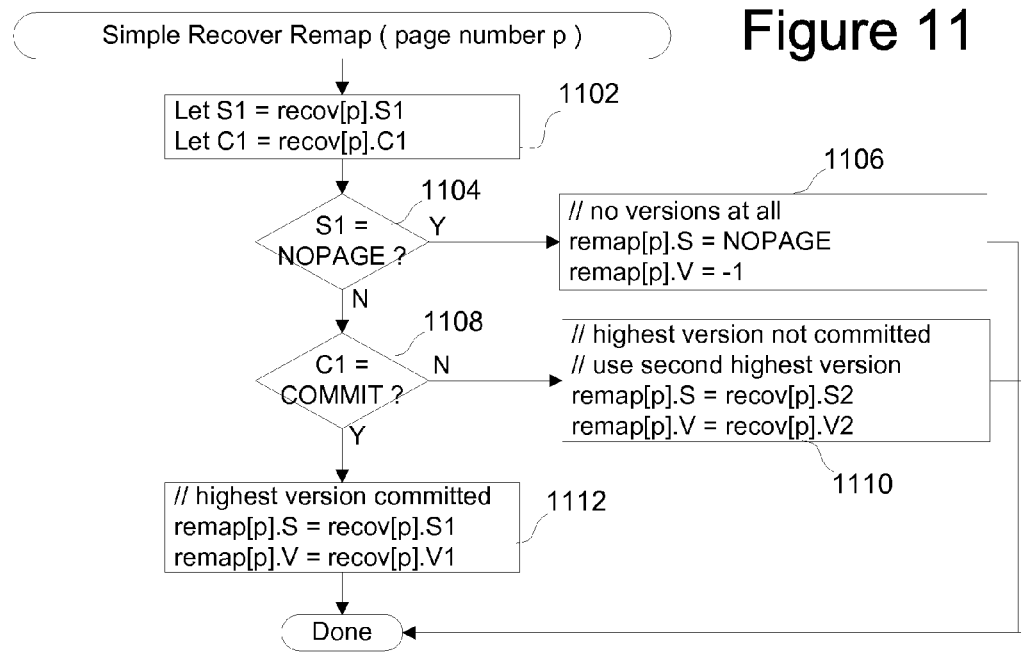
FIG. 11 is a flowchart illustrating the recovery subroutine to rebuild a page's remap entry.

FIG. 11 is a flowchart illustrating the recovery subroutine to rebuild a page's remap entry. The choice is between the highest version and the second highest version. If the highest version is committed, then it is chosen. Otherwise, the second highest version is chosen. At step 1102, the remap entries for the storage page and commit state are set. At step 1104, the method determines whether page S1 has been rubbed out and if so, then at 1106, it is known that no version exists and the remap entry is set to NOPAGE and version to −1. If not, then the commit state is checked at step 1108. If the commit state is not set, then the highest version is not committed and the second highest version is used—the remap entries are set to the recov second highest page number and second highest version number at 1110. If the state is committed at 1108, then the highest version is committed ant the remap entries are set to highest page version and version number at 1112.

Figure 12:
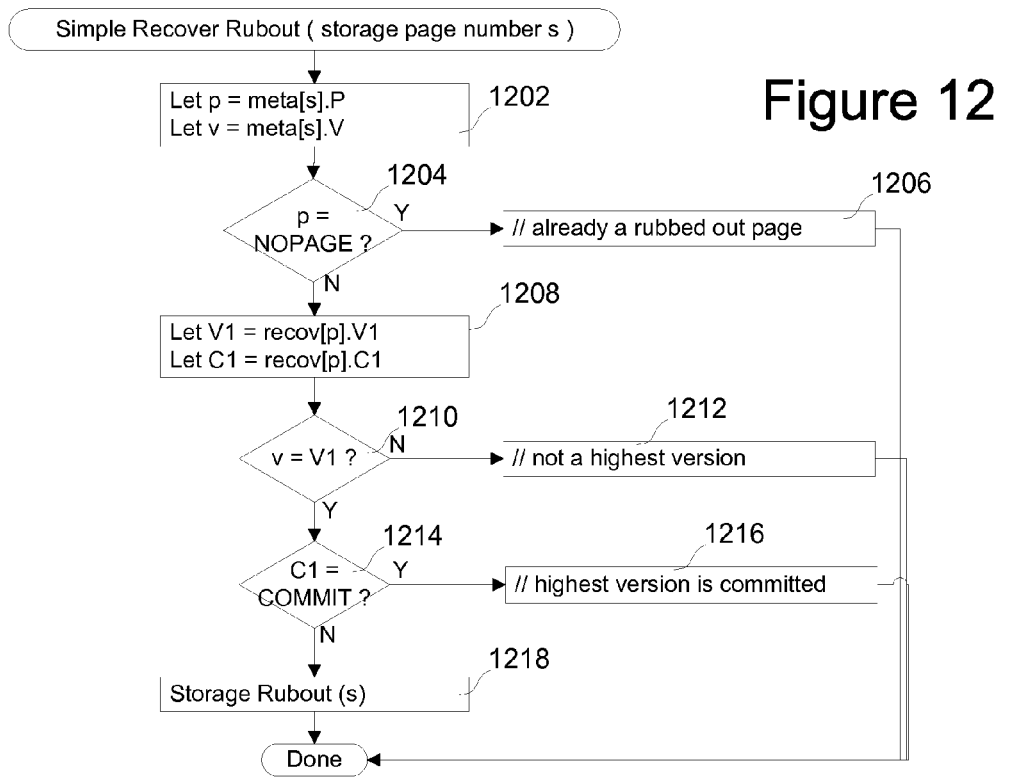
FIG. 12 gives a flowchart of the recovery subroutine to rub out a storage page containing an uncommitted intention.

FIG. 12 gives a flowchart of the recovery subroutine to rub out a storage page containing an uncommitted intention. The recovery method may determine that some highest version intentions are not committed. The presence of such intentions violates the invariant that no uncommitted intentions exist on the storage device except for intentions that are part of an in-progress transaction. These "violation intentions" must be expunged from the storage device before normal operation can resume.

At step 1202, the page number and version number are read from the metadata of a given page. At step 1204, the method checks whether the page is already rubbed out. If not, then at 1208, the recov version number and commit state are read. If the version number of the page is not equal to the recov version number at 1210, then the page is not the highest version of the page. If the version number of the page is equal to the recov version number, then at step 1214 a determination is made as to whether the state is committed. If so, the highest version is committed at 1216 and if not, then storage page s can be rubbed out at 1218.

Note that copies of an intention may be present in multiple storage pages. Therefore it is not sufficient to use the recov table to look up the storage page. In order to expunge an intention, all copies of it must be expunged from the storage device. The storage pages holding violation intentions we call violation storage pages.

As will be obvious to those skilled in the art, the violation storage pages can be rubbed out in any order. Alternatively, if the storage device supports erasing blocks of storage pages, arrangements could be made to erase the blocks containing the violation storage pages. Of course, this approach might first require copying any non-garbage contents into free storage pages in other blocks.

In an alternative embodiment, it is possible to proceed directly from recovery to normal operation and delay the expunging of violation intentions. The limit on how long the delay can be before a violation intention must be expunged is as follows. Let A be a violation intention with metadata P, V, NP, and NV. Since A is a violation intention, it must be the case that remap[P].V=V−1 and remap[NP].V=NV−1. There is no confusion as long as no subsequent intention is written to the storage device that mentions page P or page NP as either the page being written or as the next intention being linked to. We say that pages P and NP are "restricted" by A and that an intention mentioning them is a "restricted" intention. The violation intention A must be expunged before a restricted intention is written. The necessary arrangements will be obvious to those skilled in the art.

There are two possible advantages to delaying the expunging of a violation intention. First, assuming that the application does not immediately issue a write on a restricted page, recovery is faster and the application can resume operation earlier. Second, by prioritizing violation storage pages for reuse, it might turn out that all copies of the violation intention are overwritten or erased through the normal process of writing new intentions before a restricted intention comes up. The necessary arrangements will be obvious to those skilled in the art. The disadvantage to delaying the expunging of a violation intention is that additional data structures have to be maintained during normal operation.

An in-progress transaction that has not written all of its intentions may be aborted at any time without requiring that other in-progress transactions also abort. The intentions that have been written become violation intentions and thus must be expunged before their restricted pages can be written again. The necessary arrangements will be obvious to those skilled in the art.

As an alternative to restricting certain intentions until violation intentions are expunged, one or more abort records can be written that list the violation intentions by reference. The presence of an abort record would be used during the recovery method to cause the referenced violation intentions to be ignored for consideration as either the highest or second highest version numbered intention for their page. However, to avoid confusion of version numbers, a last used version number would have to be maintained for each page as in the backpointer alternative discussed below. The abort record represents storage overhead and it would have to be retained until all referenced violation intentions were expunged. The necessary arrangements will be obvious to those skilled in the art.

The abort record alternative is especially attractive in combination with the transaction number alternative described above, because all of the violation intentions in a single uncommitted transaction can be referenced by means of a single transaction number. The necessary arrangements will be obvious to those skilled in the art.

The first embodiment of the technology has the advantage that no storage device reorganization overhead is required as part of garbage collection. The first embodiment requires that an uncommitted intention left after a failure must be rubbed out before a subsequent transaction involving the same page can be started.

This second disadvantage is eliminated by the second embodiment of the technology herein referred to as the backpointer alternative.

It is known that in a given failed state, each page has some last committed version, but it may also have subsequent versions that are uncommitted. The last committed version and any subsequent versions are referred to herein as "top-level" versions. The backpointer recovery method works by determining the commitment state of the highest-numbered version for a given page. If it is committed, then it is the last committed version. If it is uncommitted, the version itself indicates the last committed version, and all intermediate versions must be uncommitted.

Like the first embodiment, the recovery method in the backpointer alternative determines the commitment state of a highest-numbered version by tracing through the version cycle. Given a particular version in the cycle, the next version in the cycle is referred to as the "target" version.

Figure 14:
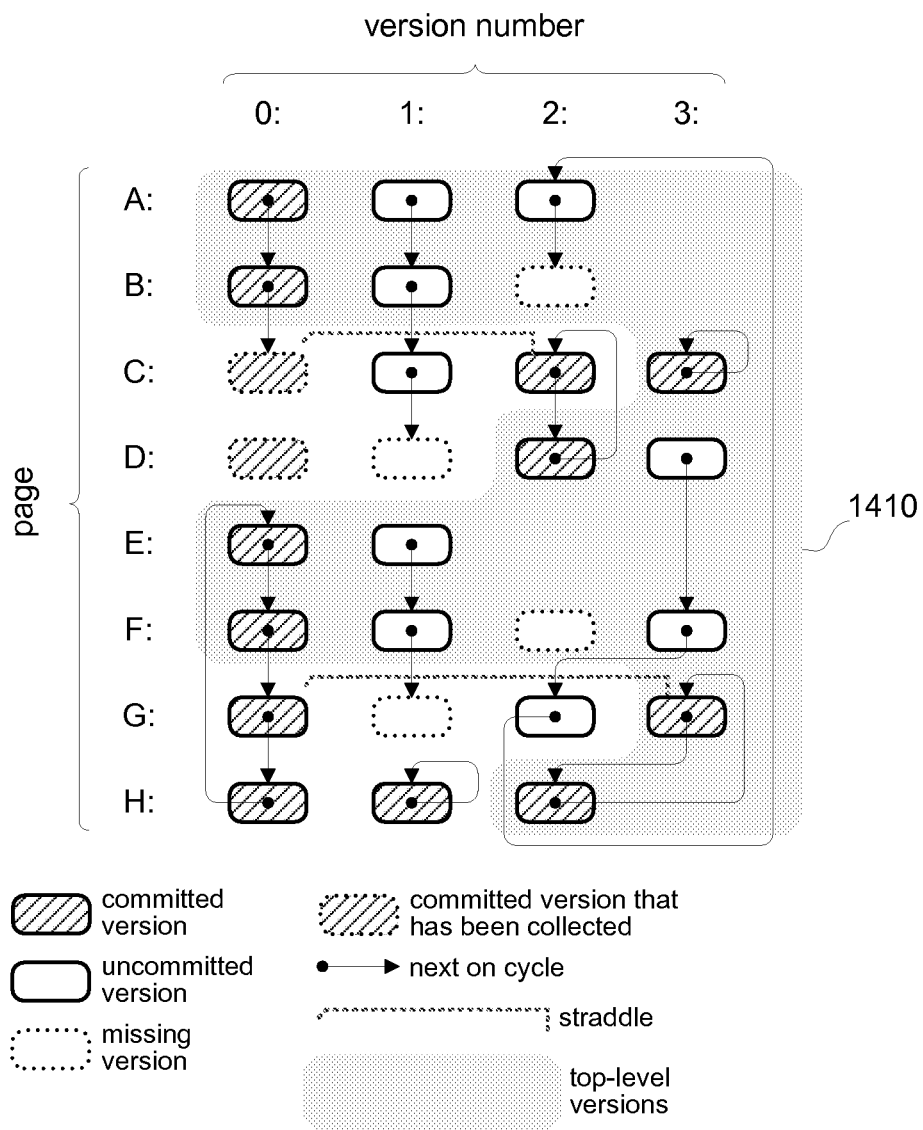
FIG. 14 shows an example labeled set of versions.

Let NP and NV be the page number and version number of the target version. If the target version were uncommitted, the next subsequent version created on page NP would have a version number higher than NV but a last committed version number lower than NV. This situation is referred to as a "straddle" and is illustrated in FIG. 14. The straddle situation proves that the target version must not have been committed. A straddle can never happen for a committed target.

The presence or absence of a straddler determines the commitment state provided that NV is less than the highest version number on page NP. If NV is higher than the highest version number on page NP then the commitment state is also determined, because the target version must be uncommitted. The only remaining case is when NV equals the highest version number on page NP. In this case the target must be a highest-numbered version, and its commitment state can be determined by recursive application of the analysis. The recursive application checks for a complete cycle, which indicates that all of the involved versions are committed.

Given that a target is uncommitted, all subsequent versions created on that page will straddle the target until finally one of them is committed, after which all further subsequent versions will not. So the committed straddler is important, because it is the last one and straddles the most. However, if a further subsequent version is committed, the committed straddler becomes superfluous for the purpose of storing data, since it is not the last committed version of its page. Nevertheless the committed straddler must be preserved because it is needed as a straddler.

Recall that the determination of commitment state depends on the presence or absence of straddlers for the target of a highest-numbered version. However, to garbage collect any uncommitted version, an uncommitted highest-numbered version might disappear, thus exposing the target of the next lower-numbered version. Therefore the determination of commitment state actually depends on the presence or absence of straddlers for the target of any top-level version.

To keep track of which versions must be preserved because they are needed as straddlers, a "designed straddler" is assigned to each top-level uncommitted version A as follows. Consider the set of all versions that straddle the target of A. From this set, choose the highest numbered version V that is not later than the last committed version. In this case, V is the "designated straddler" for A and that A belongs to the "straddle responsibility set" of V. This defines the straddle responsibility set of each version.

There may remain top-level uncommitted versions whose targets are subsequent to the last committed version of the target page (or even subsequent to the highest-numbered version of the target page) and therefore do not get a "designated straddler" via this assignment. These top-level uncommitted versions are in effect waiting for the next committed version on their target page to be their designated straddler. These top-level versions are collected into a "straddle responsibility set" associated with their target page.

Given the "top-level" determinations and "straddle responsibility sets" constructed by the recovery method, the garbage collector may collect any top-level uncommitted version and any non-top-level version that has an empty straddle responsibility set. The determination of last committed versions by the recovery analysis does not depend on the existence of such versions, and therefore they may be removed.

After recovery the system enters normal operation and the contents of the storage device evolves through the operations of erasing or overwriting the old contents of storage pages and writing new contents in them. These operations affect the "top-level" determinations and "straddle responsibility sets" that the recovery method would construct were it to be performed after such an operation. Rather than re-perform the recovery method, which would be expensive and cumbersome, the data structures are modified incrementally to produce the same result. The data structures have been designed so that this incremental maintenance is efficient to perform.

Figure 13:
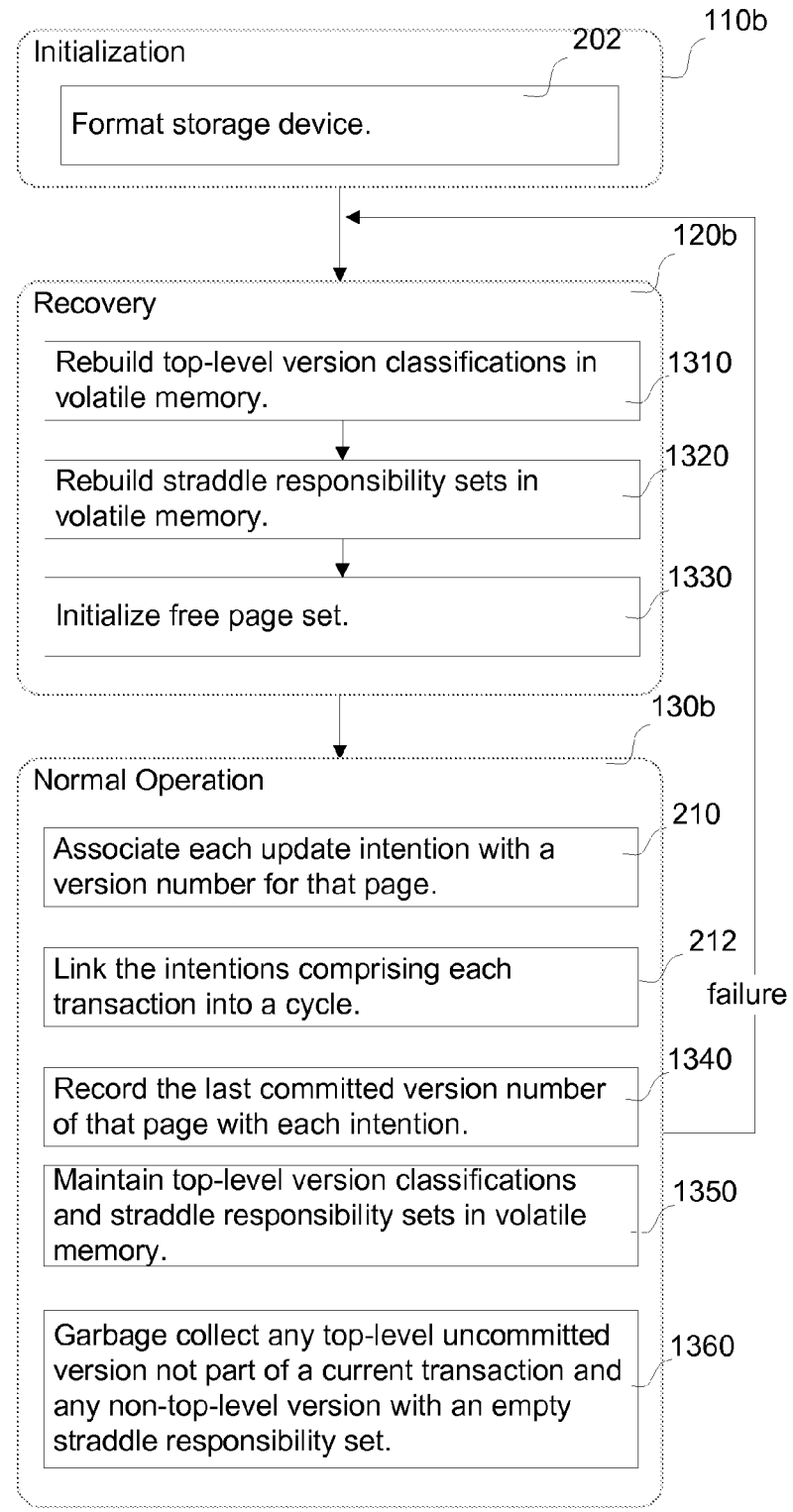
FIG. 13 illustrates the overall method according to a second embodiment of the technology sometimes referred to as the backpointer alternative.

FIG. 13 illustrates the overall method according to the backpointer alternative. As in the first embodiment, there are three main stages: initialization 110b, recovery 120b and normal operation 130b. Because initialization and recovery prepare for normal operation, it helps to discuss normal operation first. Initialization 110b is equivalent to initialization in FIG. 2 and includes only the format step 202

In normal operation 130b, each time a page is updated an associated version number is incremented. At step 210, the page and version number is included in the intention record so that the recovery method can order in time multiple intentions relating to the same page. An intention record is stored in a storage page using page data and metadata. A remap table relates each page to its existing versions and the storage page numbers where the intention records for those versions are stored.

Alternatively, instead of associating a version number with each page, a transaction number can be associated with each transaction and this transaction number can be used in all places where the description uses a version number. The necessary adaptations will be obvious to those skilled in the art. A disadvantage of the transaction number alternative is that arriving write multiple operations have to be serialized, however briefly, in order to assign them each a transaction number.

At step 212, all of the intentions belonging to the same transaction are linked together into a cycle by including in each intention the page number and version number of the next intention in the cycle. The cycle structure creates an implicit commit protocol, because (disregarding garbage collection) the recovery method can determine that all intentions were written by tracing the links and finding a complete cycle.

At step 1340, in a departure from the simple method, each intention records the last committed version number for that page. Typically the last committed version number will be the version number immediately previous to the version number of the intention. The last committed version number provides enough information to determine when an uncommitted intention has been left behind by the interruption of a transaction. The recording of the last committed version number in each intention is a unique aspect of the present technology.

For each page, the last committed version and all subsequent versions form the set of "top-level" versions. The versions subsequent to the last committed version must, of course, be uncommitted versions. A top-level uncommitted version appears in a "straddle responsibility set" associated with a designated straddler whose presence proves to the recovery method that the top-level uncommitted version is, in fact, uncommitted. A designated straddler must be preserved as long as its straddle responsibility set is non-empty. As normal operation proceeds, old intentions are removed from the storage device as their storage pages are erased or overwritten and new intentions are added. The change in the set of intentions present on the storage device affects the set of "top-level" versions and the various "straddle responsibility sets".

At step 1350, data structures representing these sets are maintained in volatile memory in an incremental fashion as storage pages are erased or overwritten on the storage device.

A version is garbage provided that it is not a top-level committed version and it has an empty straddle responsibility set. At step 1360, any storage page containing a garbage version may be reclaimed and reused.

Returning to step 202, when a transactional storage device is first brought into service, it is initialized or "formatted" so that the data structures on permanent storage can reasonably be interpreted by the recovery method. The simplest approach is to write a single transaction for each page, using version number zero, last committed version number zero, and filling the page data with zeroes. This is the only exception to the rule that the last committed version number is less than the version number of the intention. Any surplus storage pages may be filled with copies of the earlier storage pages or rubbed out or otherwise erased.

After initialization, recovery 120b is used to prepare for normal operation. The purpose of the recovery stage is to rebuild volatile data structures in preparation for normal operation. At step 1310, after reading all intentions from the storage device, the top-level versions for each page are classified by analyzing the highest numbered version and rebuilt in volatile memory. The analysis only has to determine whether the highest numbered version is committed or not. The last committed version is either the highest number version itself, or it is the last committed version as recorded in the metadata for the highest number version. The analysis is based on tracing the next pointer and when the target version is earlier than the highest number version on the target page it depends on the presence of a straddler to prove an intention is uncommitted.

Having classified the top-level versions, at step 1320, the recovery method determines a designated straddler for each uncommitted top-level version and builds straddle responsibility sets. Finally at step 1330, the recovery method collects all garbage intentions to initialize the free page set.

FIG. 14 shows an example labeled set of versions. In this example, pages are referred to by the letters A through H and the version numbers are 0, 1, 2, and 3. Links to the next version in a cycle are shown by arrows. For example, version A2 links to version B2, as shown by an arrow. In this example the various versions are labeled as to whether they are committed or uncommitted. Uncommitted versions such as A2 are indicated by white fill. Committed versions such as C3 are indicated by crosshatch fill. Although all versions in the example are labeled, the second alternative of the recovery method does not attempt to classify all versions, but only the top-level versions, those that consist of the last committed version and all subsequent versions. The set of top-level versions is indicated by a shaded background 1410. In some cases, such as for example versions C3, G3, and H2, the highest-numbered version is in fact a committed version and therefore the top-level includes only the highest-numbered version. In other cases, such as for example, versions A0 and D2, the last committed version is succeeded by one or more uncommitted versions.

Some versions in FIG. 14 are missing, such as version B2. Perhaps B2 was never written or perhaps it was written but never committed and then subsequently garbage collected. Missing versions are indicated by a dotted border. Version C0 is also missing, it must have been a committed version, since it is linked from committed version B0. Version C0 is superseded by a later committed version C2 so presumably the garbage collector reclaimed and reused the storage page occupied by C0. Therefore version C0 is indicated as both committed and missing. Presumably C0 had a link to some other committed version as part of a complete cycle, but that link is no longer present in the existing set of versions.

In FIG. 14, version B1 links to version C1. However C2 is a later version for page C than version C1 and at the time that C2 was written, the last committed version for page C was version C0. Therefore version C2 "straddles" the next pointer of B1. The straddle is indicated by a dashed bar across the next pointer. The straddle proves that version B1 must be uncommitted. Version C2 is the "designated straddler" for version B1. Note that even though version C2 is not a top-level committed version (due to the existence of C3) it must be preserved because it is a designated straddler.

To be a designated straddler a version must fulfill three requirements: (1) it has to straddle a next pointer from a top-level version, (2) it has to be the latest version on its page that straddles that next pointer, and (3) it has to be no later than the last committed version on its page. Observe in FIG. 14 that version D2 straddles the next pointer of C1 but C1 is not a top-level version so D2 fails requirement (1). Version G2 straddles the next pointer of F1 but G3 is a later version on its page that also straddles the next pointer of F1 so G2 fails requirement (2). Version F3 straddles the next pointer of E1 but F3 is later than the last committed version on page F so F3 fails requirement (3).

In FIG. 14, the last used version number for page B is 2, even though no version B2 exists. Perhaps version B2 existed at one time and was garbage collected or perhaps it was never written at all, but because version B2 is the target of version A2, the version number is in use, so the next subsequent version created for page B must be version B3.

An example of the recovery method top-level classification analysis proceeds given the example set of versions shown in FIG. 14 is as follows. Suppose that the analysis starts with page A. The highest version is A2. A2 links to B2, which is higher than the highest-numbered existing version in page B, so A2 must be classified as "uncommitted". A2 says that the last committed version on page A is A0. Therefore the intermediate version A1 must be classified as "uncommitted" and finally version A0 as "committed".

Next the analysis moves on to page B. The highest-numbered version is B1, which links to C1. C1 is straddled by C2, so B1 must be classified as "uncommitted". B1 says that the last committed version on page B is B0. There are no intermediate versions and version B0 must be classified as "committed".

Next the analysis moves on to page C. The highest-numbered version is C3, which links to C3, forming a complete cycle. Therefore C3 must be classified as "committed".

Next the analysis moves on to page D. The highest-numbered version is D3, which links to F3, also a highest-numbered version. Therefore the analysis applies itself recursively to F3. F3 links to G2, which is straddled by G3. Therefore F3 and D3 must be classified as "uncommitted". F3 says that the last committed version is F0. The intermediate version F1 must be classified as "uncommitted" and finally version F0 as "committed". D3 says that the last committed version is D2. There are no intermediate versions and version D2 must be classified as "committed".

Next the analysis moves on to page E. The highest-numbered version is E1. E1 links to F1, which is straddled by F3. So the analysis concludes that E1 must be classified as "uncommitted". This is a correct conclusion, even though F3 is not a designated straddler. In fact, at this point, the analysis does not know which versions are designated straddlers or not. The reason F3 is not a designated straddler is that it would not cause the analysis to reach a different conclusion if F3 were removed. Observe that the analysis has already classified F1 as "uncommitted" so alternatively it could immediately conclude that E1 must be classified as "uncommitted" without even needing to look for the straddler. In any event, E1 says that the last committed version is E0. There are no intermediate versions and version E0 must be classified as "committed".

Page F already having been analyzed, next suppose that the analysis moves on to page G. The highest-numbered version is G3. G3 links to H2, also a highest-numbered version. Therefore the analysis applies itself recursively to H2. H2 links to G3, forming a complete cycle. Therefore H2 and G3 must be classified as "committed".

There remaining no more pages to consider, the classification of top-level versions is complete.

Observe that the analysis depends on the existence of version C2, which straddles C1 and proves that B1 is uncommitted, even though C2 is not a top-level version. Therefore, C2 must be preserved as long as B1 exists as a top-level version. C2 therefore has "straddle responsibility" for B1.

Likewise, version G3 has straddle responsibility for F1 and F3. At the point in time illustrated in the example, G3 is a top-level committed version, so it must be preserved anyway since it contains the most recent committed data for page G. However, if page G were updated in a subsequent committed transaction, G3 would cease to be a top-level version but it would have to be preserved as long as F1 or F3 continued to exist as top-level versions.

Although the analysis in this example did not depend on G3 straddling the target of F1, G3 still has straddle responsibility for F1. In the future, the top-level uncommitted version F3 could be garbage collected, which would expose F1 to the analysis.

A version can only have straddle responsibility for a top-level uncommitted version. If a version is not top-level, the analysis will never need to classify it, and if a version is committed, it is impossible for there to be a straddle. So there are two ways in which a version can be relieved of straddle responsibility for a version X. The first is for a new version to be committed on the same page as X, which causes X to cease to be a top-level version. The second is for version X to be eliminated so that it will never in the future be encountered by a recovery method.

Because only one transaction can be in-progress for any given page at the same time, a version can only acquire straddle responsibility at the moment its transaction commits. Referring to the example in FIG. 14, suppose that a new transaction consisting of the single version B3 were committed. B3 would at that moment acquire straddle responsibility for versions A1 and A2, since they have targets of B1 and B2 respectively, which would be straddled by B3. So in the state at the time illustrated in FIG. 14, versions A1 and A2 are in effect waiting for the next committed version on page B to come and take straddle responsibility for them. We say that page B has "straddle responsibility" for A1 and A2, meaning that the next committed version on page B will take this responsibility.

Figure 15:
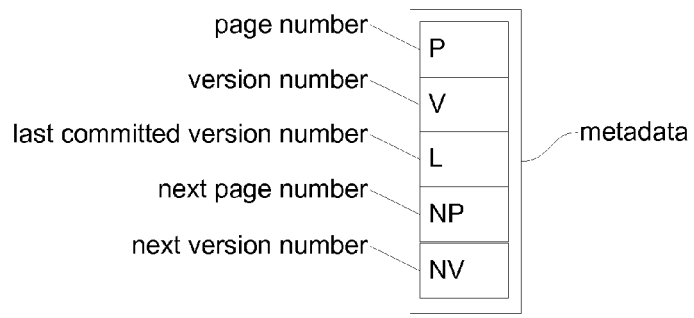
FIG. 15 illustrates the metadata fields stored with each page according to a second embodiment of the technology.

FIG. 15 illustrates the metadata fields stored with each page according to a second embodiment of the technology. A storage page is interpreted as an intention to write a certain page as indicated by the metadata. The metadata fields are as follows. Field P contains the page for which the data is intended to be written. Field V contains the version number of the intention and is used to order in time multiple intentions for the same logical page. Field L contains the last committed version number (prior to this intention) for the same page as this intention. Fields NP and NV contain the page number and version number of the next intention in the cycle of intentions comprising the current transaction.

FIG. 15 illustrates the page format and metadata fields according to the backpointer alternative. In a standard page of data, the metadata would also include an error correction code field to ensure the integrity of the data and the metadata. These metadata fields include the page number P, the version number V, the last committed version number L and next page number NP and the next version number NV. Usually the last committed version number L will be the version immediately prior to the version number listed in the storage page. However, when an intention is left uncommitted (for example due to a failure), the next intention written for that page will have a last committed version number that refers to a version prior to the immediately prior version.

Figure 16:
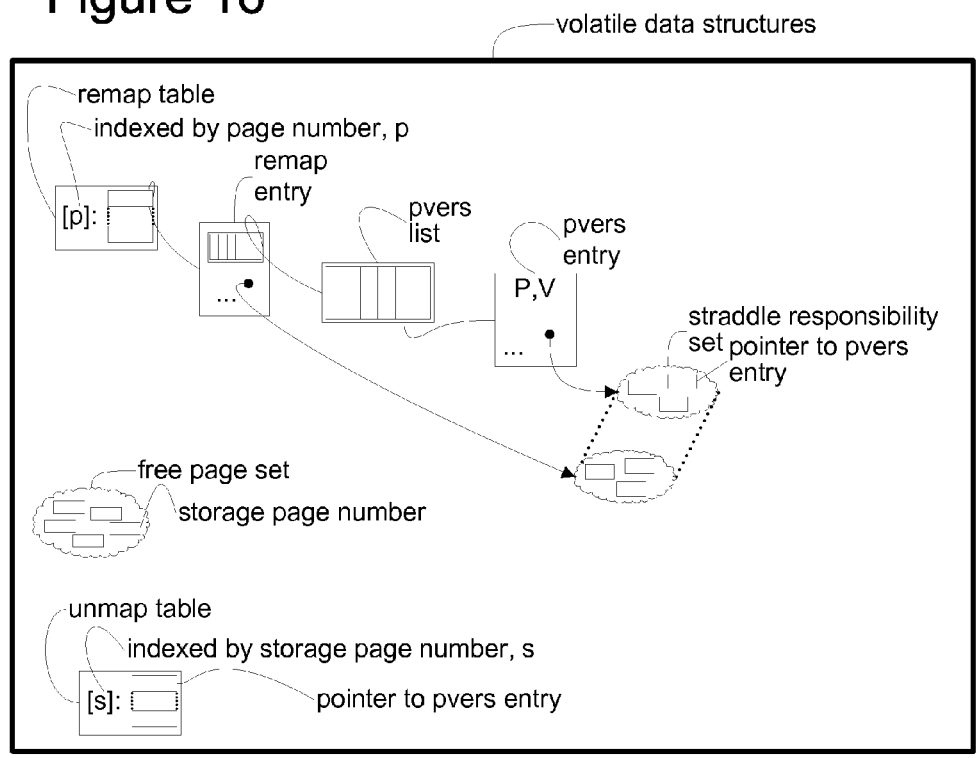
FIG. 16 illustrates the volatile data structures used with the second embodiment of the recovery method of the technology.

FIG. 16 illustrates the volatile data structures used with the second embodiment of the recovery method of the technology. These data structures may be stored in the host system, such as a computer system's RAM memory. They do not survive a failure but must be rebuilt by the recovery process from the permanent data structure stored on the storage device.

The volatile data structures consist of a remap table, a free page set, and an unmap table. The remap table organizes information relevant to each page, including all of the versions of that page, the classification of the top-level versions, and the straddle responsibility sets. It is described in more detail below. The free page set contains storage page numbers of free storage pages on the storage device. The unmap table relates storage pages back to pvers entries for the corresponding intentions.

Figure 17:
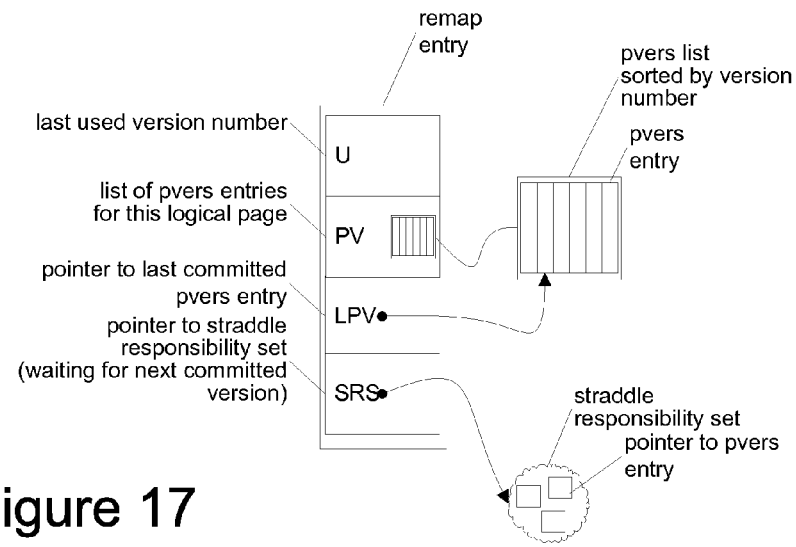
FIG. 17 illustrates the fields in a remap entry used with the second embodiment of the recovery method of the technology.

FIG. 17 illustrates the fields in a remap entry in the backpointer alternative. Each remap entry contains information about a given page. Because of the complicated conditions required to control the order of garbage collection, much more information is required than for the simple alternative.

Since the recovery process determines which intentions are committed but leaves all of the uncommitted intentions untouched, there could exist uncommitted intentions with version numbers higher than that of the last committed version number. There could also exist links to missing intentions with version numbers higher than that of the last committed version number, and these version numbers must also be considered as used. Field U contains the last used version number.

Field PV contains information about each the existing versions for this page, organized as a list of pvers entries which may be advantageously sorted by version number. The contents of a pvers entry are described below in FIG. 18. Field LPV contains a pointer to the last committed pvers entry. Field SRS contains a pointer to a straddle responsibility set that indicates which existing top-level uncommitted versions have next links that will be straddled by the next committed version of this page.

Figure 18:
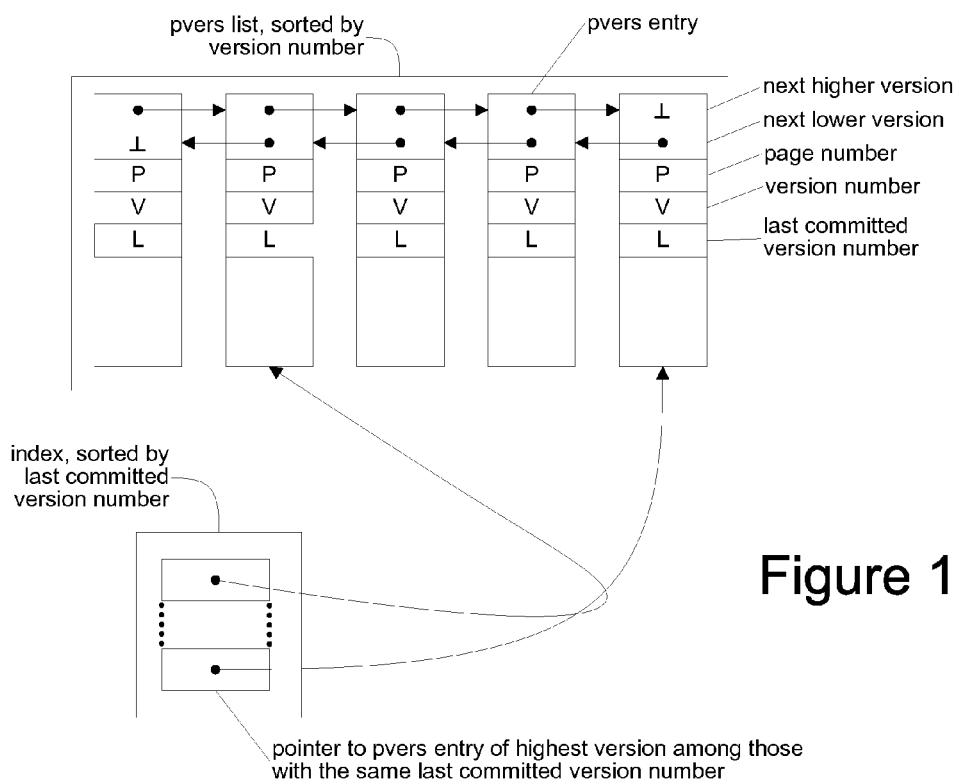
FIG. 18 illustrates the structure of the pvers list used in the second embodiment of the recovery method of the technology.

FIG. 18 illustrates the structure of the pvers list. The pvers list is sorted by version number and doubly-linked so that deleting an existing pvers entry is efficient. During normal operation the only operations that need to be performed on the pvers list are insertion of a new highest version (when a new version is committed) and deletion (when a garbage intention is expunged). It will be obvious to those skilled in the art how to perform these operations efficiently on a sorted, doubly-linked list.

During recovery, finding straddlers is also required. Given a target version number NV, a straddler is the pvers entry pv of highest version number such that pv.L<NV and NV<pv.V. Note that sorting the pvers list by version number also sorts it by last committed version number. As illustrated in FIG. 18, during recovery the pvers list is augmented with a sorted index based on last committed version number. Alternatively, the sorted index can be based on version number. The sorted index can be used for the efficient finding of straddlers via binary search. During recovery all versions of all pages can be gathered during the scan and then sorted to produce the sorted index.

Figure 19:
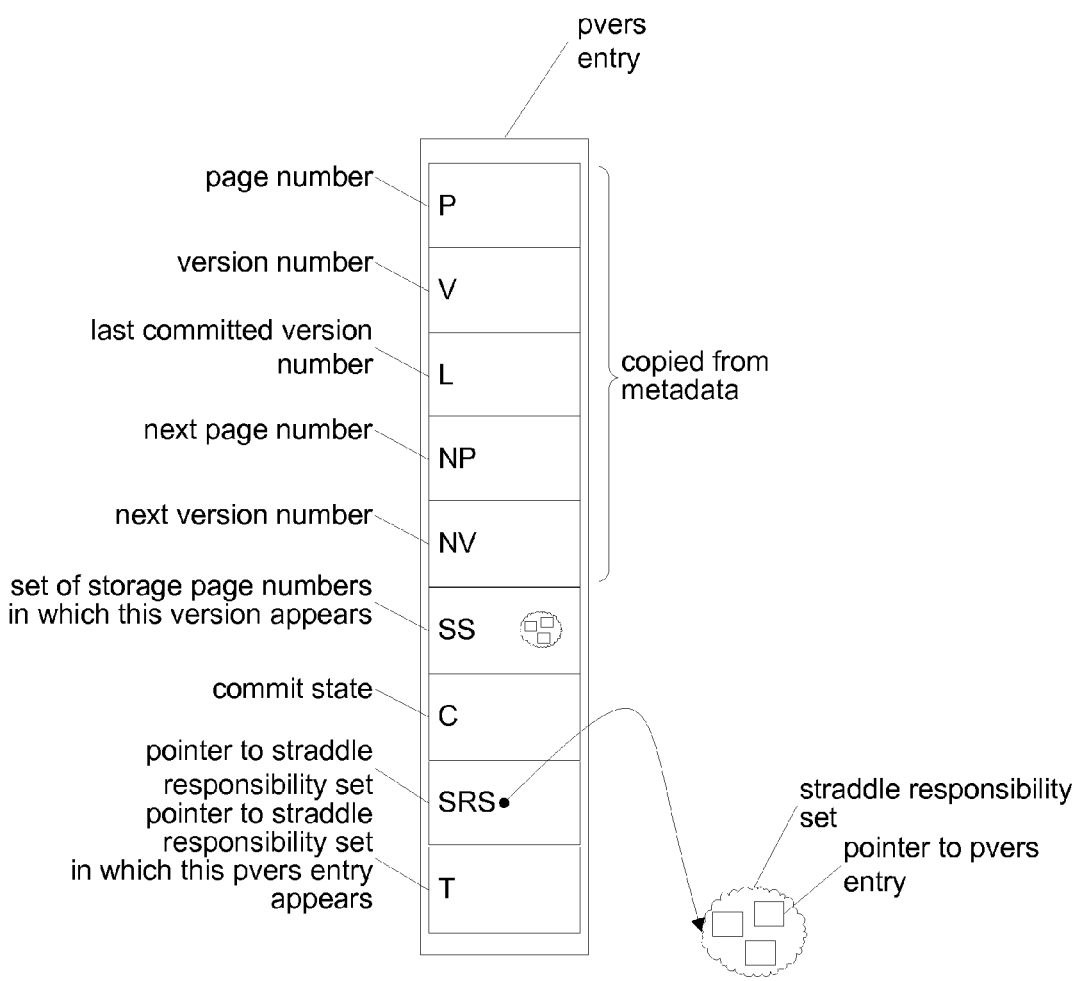
FIG. 19 illustrates the fields in a pvers entry according to a one embodiment of the backpointer alternative.

FIG. 19 illustrates the fields in a pvers entry according to a one embodiment of the backpointer alternative. The P, V, L, NP, and NV fields are copied from the corresponding metadata fields of the version as stored on the storage device. Field SS contains the set of storage page numbers in which copies of the version are stored. Field C contains the classification of the commitment state of this version. The commitment state is one of NONE, UNCOMMIT, COMMIT. NONE means that the commitment state is not classified. UNCOMMIT means that the version is a top-level version known to be uncommitted. COMMIT means that the version is a top-level version known to be committed. Field SRS contains a pointer to a straddle responsibility set that indicates versions for which this version is the designated straddler. Field T contains a pointer to the straddle responsibility set in which this version appears, or null, if there is none.

Note that when a new version is committed for page P, the straddle responsibility set of page P is transferred from the remap entry of page P to the pvers entry of the new version, and a new, empty straddle responsibility set is assigned to the remap entry of page P. This is why the SRS fields may be implemented as pointers.

Each straddle responsibility set represents the association of a set of top-level uncommitted versions with their designated straddler. In the case of a straddle responsibility set assigned to a page, this designated straddler does not yet exist, since it will be the next committed version of the page. However, in the case of a straddle responsibility set assigned to a version, the designated straddler is the version. In the latter case, each straddle responsibility set keeps a backpointer to the pvers entry which is the designated straddler. This backpointer is initialized when the straddle responsibility set is transferred from the remap entry of a page to a newly committed version. The necessary arrangements will be obvious to those skilled in the art.

Observe that a pvers entry can appear in at most one straddle responsibility set. Membership in a straddle responsibility set is implemented via doubly-linked threading through the pvers entries so that the operation of deleting a pvers entry from the set in which it appears is an efficient operation.

The pvers entry has to keep track of all storage pages in which the version appears, but this is only necessary for uncommitted top-level versions. Such versions appear in a straddle responsibility set and cannot be removed from that set as long as they continue to exist as top-level versions. The version continues to exist as long as any copy is present on the storage device. Therefore, the volatile data structures track every copy until they are all erased or overwritten.

A method of reading the current contents of page number P involves looking up the last committed pvers entry in the remap table entry for page P, choosing one of the storage pages from the SS field, and then reading that page from the storage device.

As with the first embodiment, in order to maintain data integrity, a new protocol for writing transactions for pages of memory is provided. The protocol allows for the recovery of operations in progress during a host failure.

Figure 20:
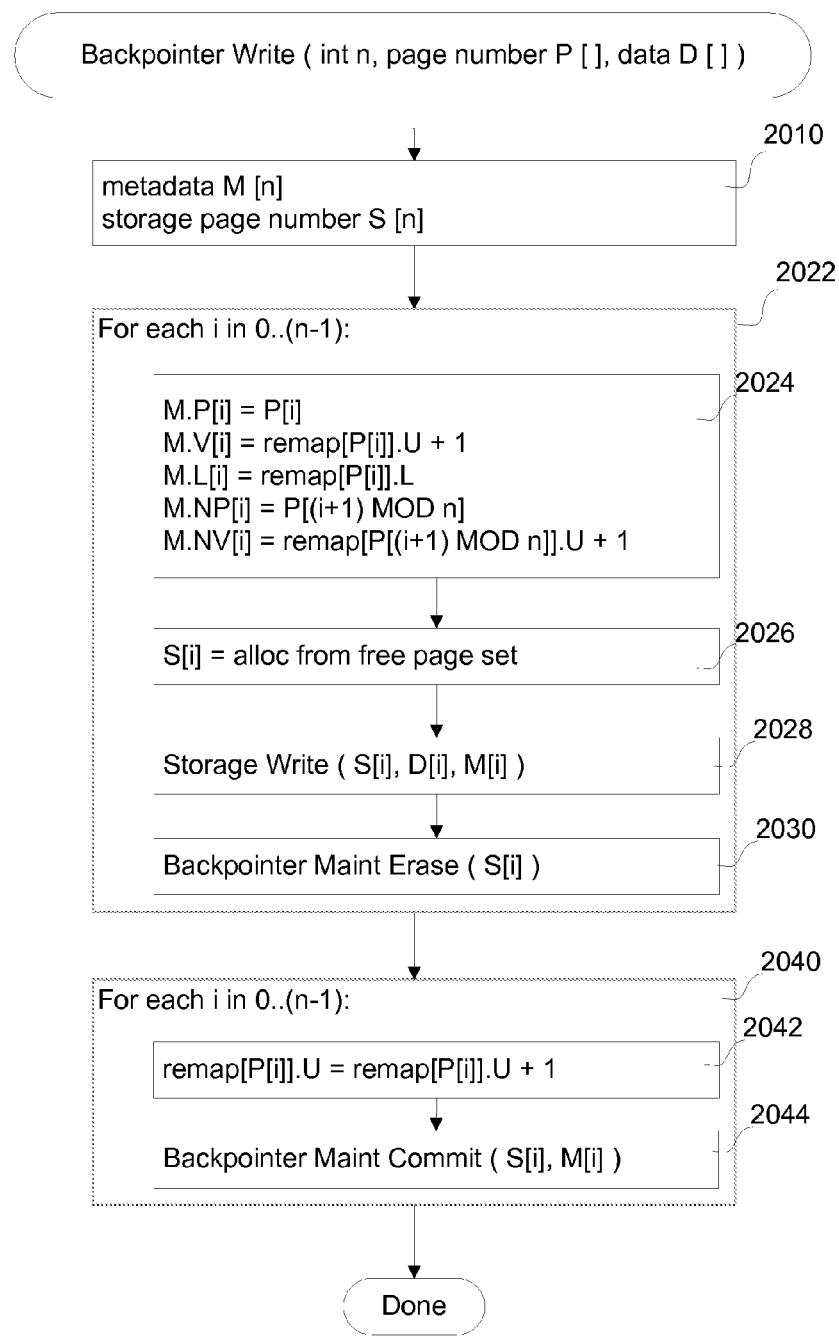
FIG. 20 is a flowchart illustrating a method of writing multiple pages in a transaction according to a backpointer alternative.

FIG. 20 is a flowchart illustrating a method of writing multiple pages in a transaction according a backpointer alternative. As will be obvious to those skilled in the art, the pages may be written to the storage device in any sequence and overlapped in time. After all storage pages are written, the volatile data structures are updated to reflect that a new cycle of versions has been committed.

At step 2010, each page (n) includes metatdata M (n) an and a storage page number S(n). At step 2022 for each page 0 to n−1, at step 2024, the remap table is consulted to determine the last committed version, and the intention is written for the next version. That is, for each metadata entry P, V, L, NP and NV for page i, the remap data provides the last committed version and the next committed version written based on that version.

At step 2026, the next free page S[i] is returned from the free page set and a storage write of the free page number, the data and the metadata occurs at step 2028.

Figure 21:
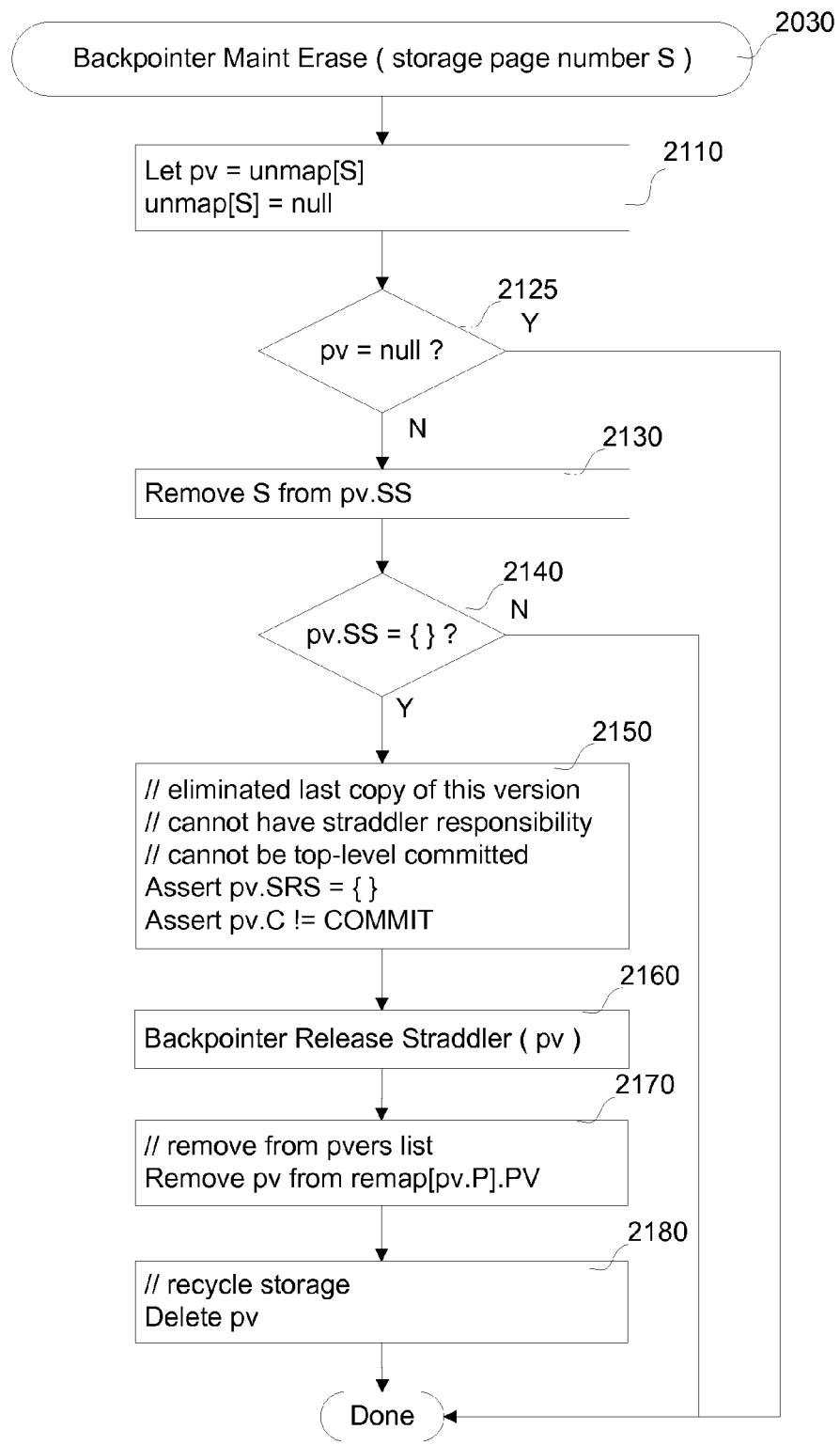
FIG. 21 is a flowchart illustrating how the backpointer maintenance erase process maintains the volatile data structures when a storage page is erased, overwritten, or rubbed out.

A backpointer maintenance erase, as described with respect to FIG. 21, then occurs. The backpointer maintenance erase process at step 2030 maintains the volatile data structures when a storage page is erased, overwritten or rubbed out.

Figure 22:
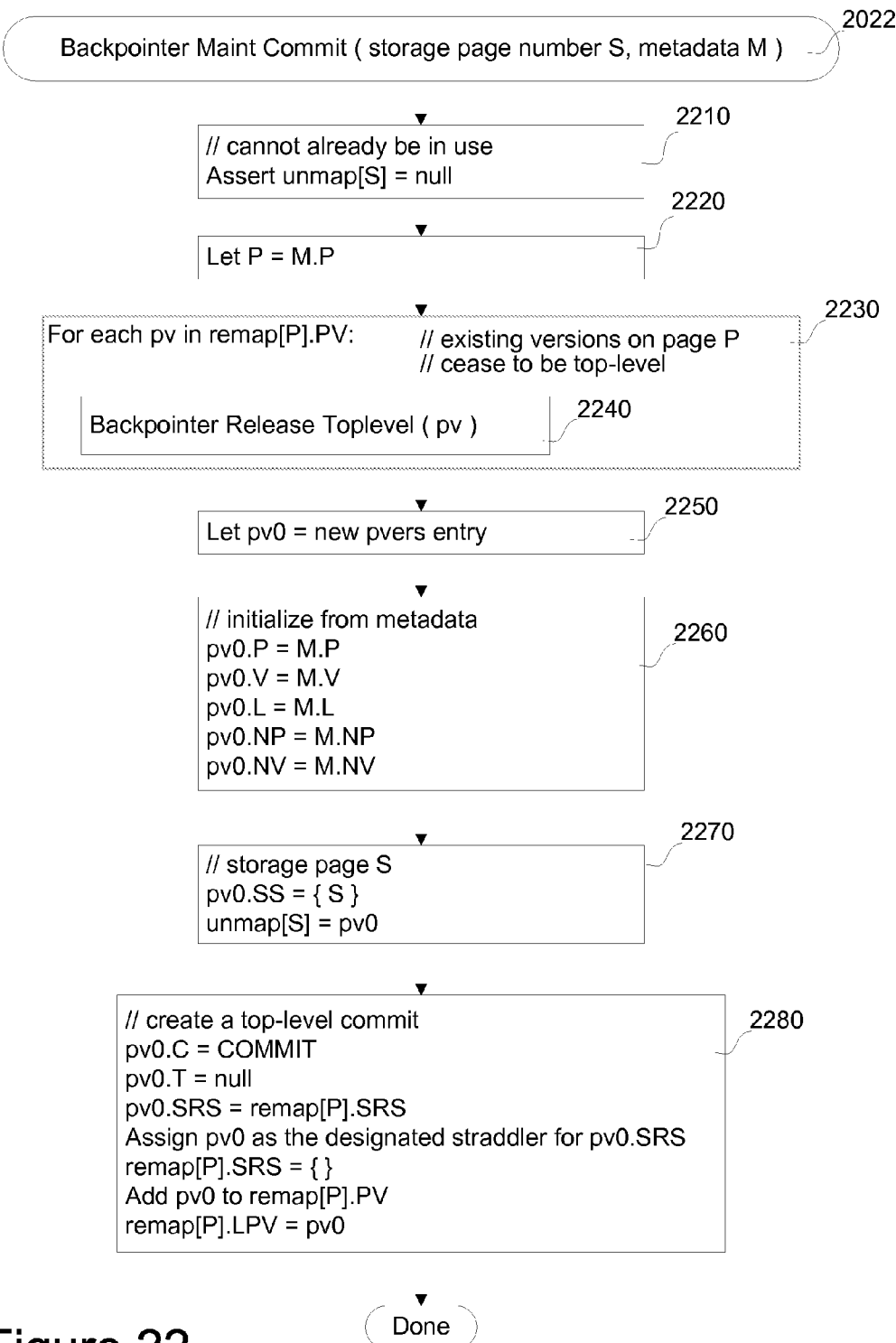
FIG. 22 is a flowchart illustrating a method of maintaining the volatile data structures when a new version is committed.

After a storage page is written, the volatile data structures are updated to reflect that any prior version stored in that storage page has been overwritten. At step 2040 for each page 0 to n−1, steps 2042 and 2044 occur. At step 2042, the remap page entry for the last used version number is updated and a backpointer maintenance commit process described below with respect to FIG. 22 is completed at step 2044

Alternatively, the volatile data structures could be updated with each storage page written to the storage device, indicating that another uncommitted version is present, and then finally converting them all to committed versions when they are all written.

Note that writing a single page in a transaction is merely a simple instance of writing multiple pages in a transaction. Therefore no specific method needs to be specified for this operation.

Figure 24:
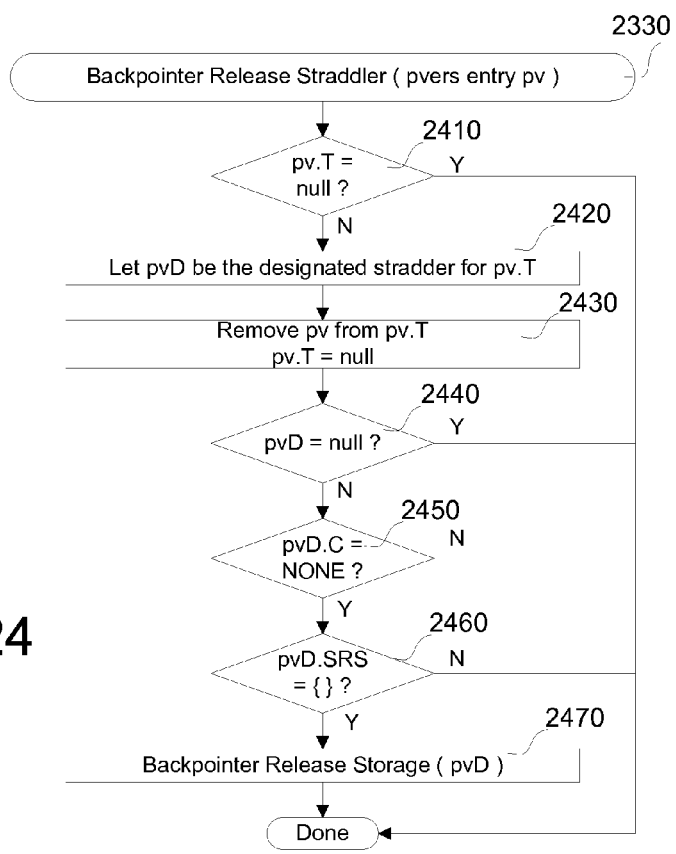
FIG. 24 is a flowchart illustrating for a subroutine to release the designated straddler from a version.

FIG. 21 is a flowchart illustrating the backpointer maintenance erase process 2030 which maintains the volatile data structures when a storage page is erased, overwritten, or rubbed out. At step 2110, the unmap table is used to find the pvers entry corresponding to the version formerly stored in the storage page, if any. At step 2130, the storage page is removed from the set of copies of the version. At step 2140, if removal of the storage page makes the set of copies empty, then the version itself has been eliminated. At step 2150, it may be assumed that the pointer to the straddle responsibility set is null and the commit state is not COMMIT. An eliminated version cannot be responsible for any straddles and it cannot be a top-level committed version. At step 2160, a backpointer release straddler process to release the designated straddler from a version, described with respect to FIG. 24, is performed. Eliminating a version releases its designated straddler (if any) from responsibility for it. At step 2170, the pvers entry itself must be removed from the pvers list of versions for its page. At step 2180, the storage space occupied by the pvers entry can then be recycled. In any event, at step 2110 the unmap entry for the storage page is cleared.

FIG. 22 is a flowchart illustrating a method 2044 of maintaining the volatile data structures when a new version is committed. The storage page must not already be in use so at step 2210, it may be assumed that the storage page unmap entry is null.

At step 2220, for a given page number, the page data is taken from the page metadata. At step 2230, since the new version will be the last committed version, all existing top-level versions of the page cease to be top-level versions. At step 2230, for each pv entry, the backpointer top-level release process 2240 is performed. The top-level versions can be found directly at the high version-numbered end of the sorted pvers list.

At step 2250, a new pvers entry is allocated to contain information about the new version. At step 2260, relevant fields are copied from the metadata and at step 2270 the set of physical pages containing copies of this version is initialized to a singleton set containing just the written storage page number. Also at step 2270, the unmap entry for the storage page is set to point to the new pvers entry.

At step 2280, the commitment state classification is initialized to COMMIT. Since the target of a committed version cannot be straddled, the version appears in no straddle responsibility set. However, this version could be responsible for some straddles, so the straddle responsibility set is transferred from the page remap entry to the new pvers entry. The new pvers entry is inserted into the page remap entry pvers list, and will be the highest version numbered entry. The last committed pvers field in the page remap entry is set to point to the new pvers entry.

Figure 23:
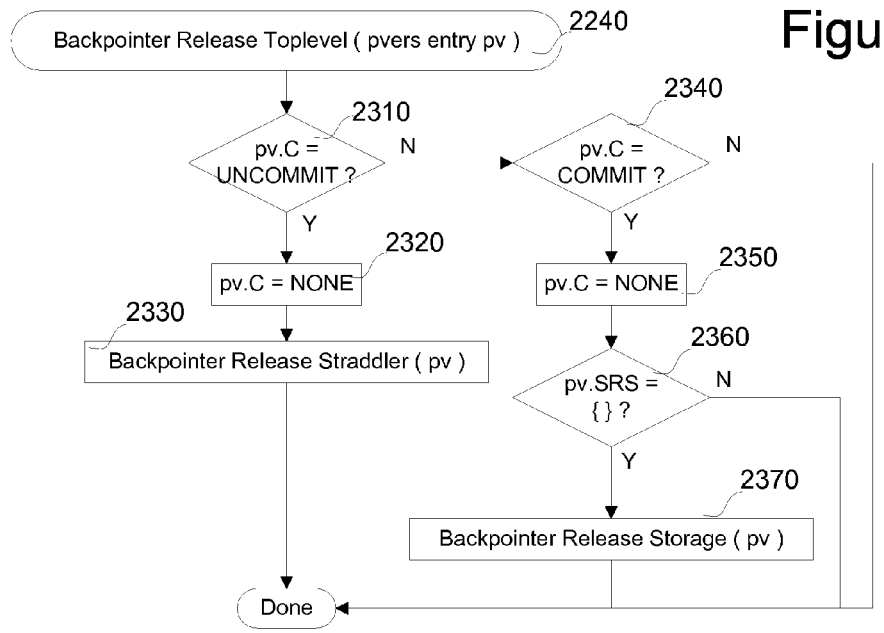
FIG. 23 is a flowchart illustrating a subroutine to release top-level status from a version.

FIG. 23 is a flowchart illustrating a subroutine 2240 to release top-level status from a version. At step 2310, a test is made as to whether the pvers entry version is classified as UNCOMMIT. If so, it is a top-level uncommitted version. When it ceases to be a top-level version, it must release its designated straddler at step 2330 using the method described at FIG. 24. If the pvers entry is classified as COMMIT at step 2340, it is the top-level committed version. If its straddle responsibility set is empty, at step 2360, then all of its storage pages become free using the backpointer release storage process described below with respect to FIG. 25.

FIG. 24 is a flowchart illustrating for a subroutine 2330 to release the designated straddler from a version. The pvers entry T field indicates which straddle responsibility set the version appears in, if any. The straddle responsibility set can be associated either with a page, in which case the included versions are waiting for the next committed version on that page to be their designated straddler, or it can be associated with a version, in which case that version is the designated straddler. At step 2410, if the pvers entry T is not null, the entry is set to be a designated straddler at 2420. The entry T is set to null at step 2430. The designated entry is then tested to determine if the designated straddler that is not a top-level version at step 2440, if the commit state of the designated straddler is NONE at step 2450 and if removing the version from the straddle responsibility set leaves the set empty at step 2460. If so, then at step 2470 the designated straddler is no longer required and its storage can be reclaimed using the backpointer release storage method 2370.

FIG. 25 is a flowchart illustrating the method 2370 to release storage from a version. For each storage page s in pvers entry SS, at 2510, each storage page s holding a copy of the version is added to the free page set at 2520.

Note that just because the storage pages holding copies of the version have been released to the free page set, the version continues to exist on the storage device until all the storage pages containing it have been erased or overwritten. If the system was interrupted and the recovery method had to be invoked, the version would be found and if it was a top-level uncommitted version, a designated straddler might be required to prove that the version was uncommitted. The volatile data structures make sure that the designated straddler is preserved as long as it might be required.

In one embodiment, storage pages containing top-level uncommitted versions can be scheduled for priority of reuse, thus releasing their designated straddlers as soon as possible. Alternatively, storage pages containing top-level uncommitted versions can be rubbed out, which would accomplish the same end.

FIG. 26 is a flowchart illustrating a method of returning storage pages to the free page set. A storage page which has been erased or rubbed out contains no version and hence is free. A storage page which contains a version that is not a top-level committed version and that has no straddle responsibilities is also free. For each page s not in the free page set at 2610, at step 2620, the unmap table is used to obtain a pointer to the corresponding pvers entry at 2630 and if the pointer is null, page s can be added to the free page set. If pv is not null at step 2630, then the commit state is checked at 2650. If the page is not committed and the straddle set is empty at 2660, the page can be added to the free page set at 2640.

Some types of storage devices, such as flash memory, cannot write a written storage page without first subjecting the written storage page to an erasure process. Moreover, typically the erasure process cannot be applied to a single storage page but only to a large block of storage pages. In order to arrange for an entire block of storage pages to be garbage, it is sometimes necessary to copy the contents of one or more storage pages into other storage pages.

FIG. 27 is a flowchart illustrating a method of maintaining the volatile data structures when a storage page is copied. The new storage page must not already be in use. The method refers to a new storage page S1 and an existing storage page S0.

At step 2720, it may be assumed that the unmap entry for page S0 is not null and the unmap entry for the new page S1 is null. At step 2730, the new page number S1 is added to the set of storage page numbers in which the version appears and the unmap entry for S1 is set to the unmap entry for S0.

Once the erasure process has succeeded in erasing a block of storage pages, the volatile data structures should be updated accordingly, because any versions that were stored only on the erased pages are no longer available.

Alternatively, when arranging for an entire block of storage pages to be garbage, it may happen that one of the non-garbage storage pages is a non-top-level designated straddler with only a few versions in its straddle responsibility set. In such a case, rather than copying the designated straddler, it may be more efficient to rub out all of the storage pages holding copies of the versions in its straddle responsibility set and thus release the designated straddler, making it garbage.

Figure 28:
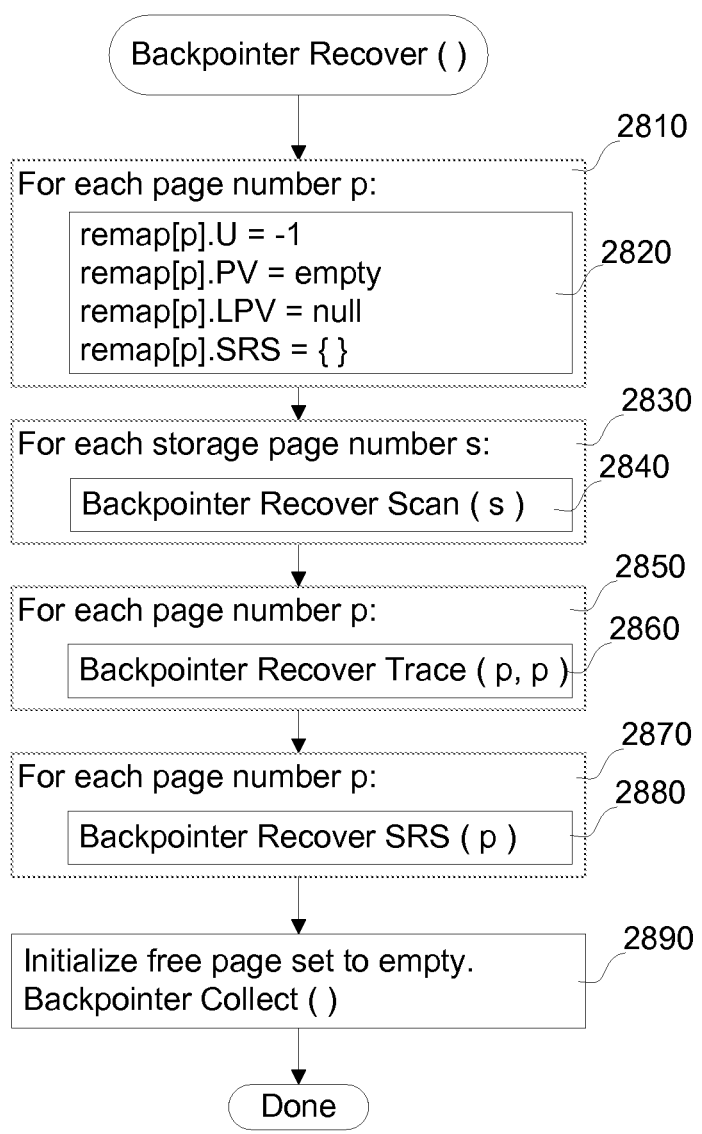
FIG. 28 is a flowchart illustrating the backpointer recovery method.

FIG. 28 is a flowchart illustrating the backpointer recovery method. The recovery method comprises five major steps: initializing the remap table 2810, scanning the metadata of all storage pages 2830, tracing cycle links for the highest version intention of each page and classifying all top-level versions 2850, building the straddle responsibility sets 2870, and initializing the free page set 2890. These steps are meant to be illustrative and the actions described may be reordered and recombined as will be obvious to those skilled in the art.

Figure 29:
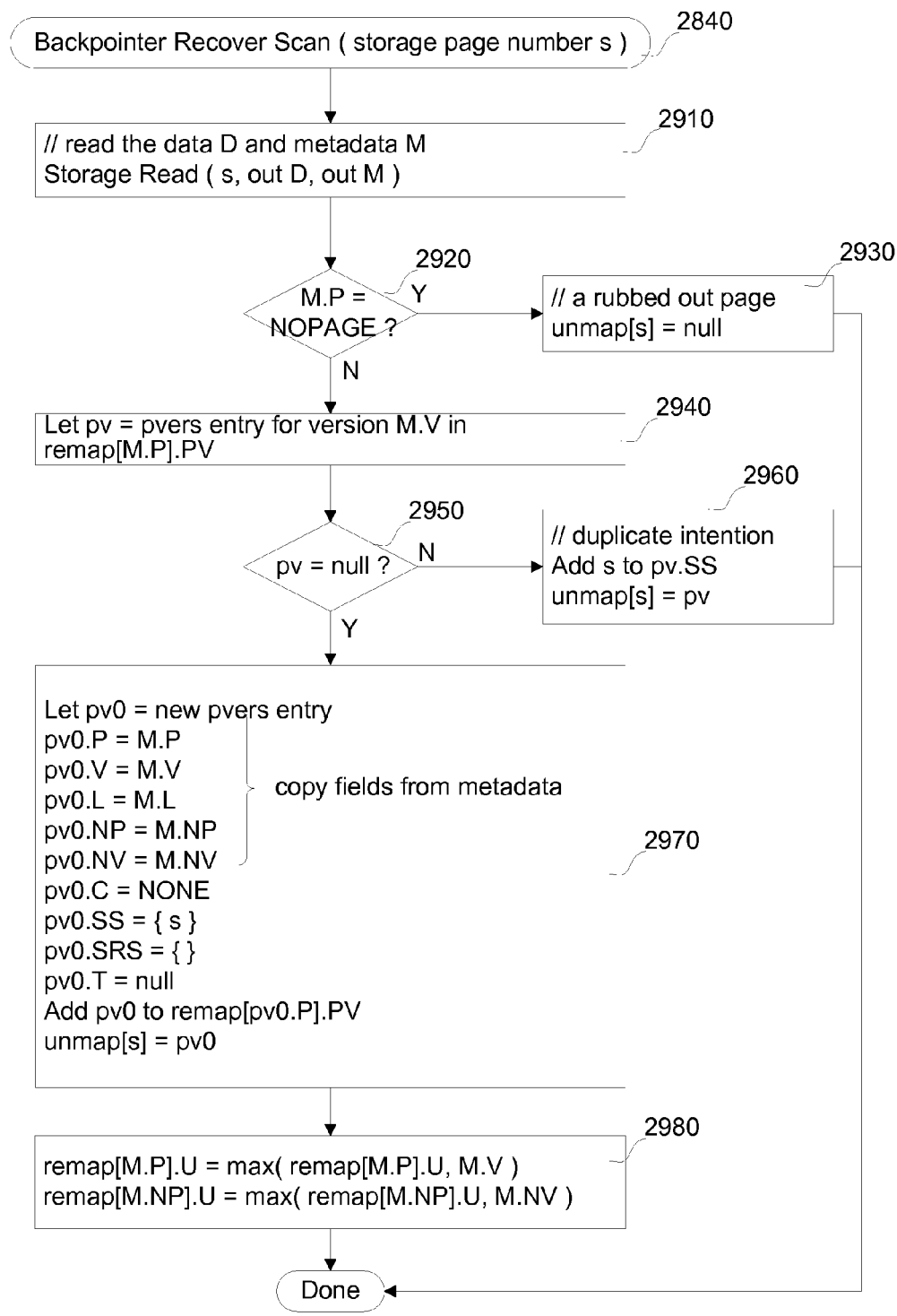
FIG. 29 is a flowchart illustrating the recovery subroutine to scan a storage page.
Figure 30:
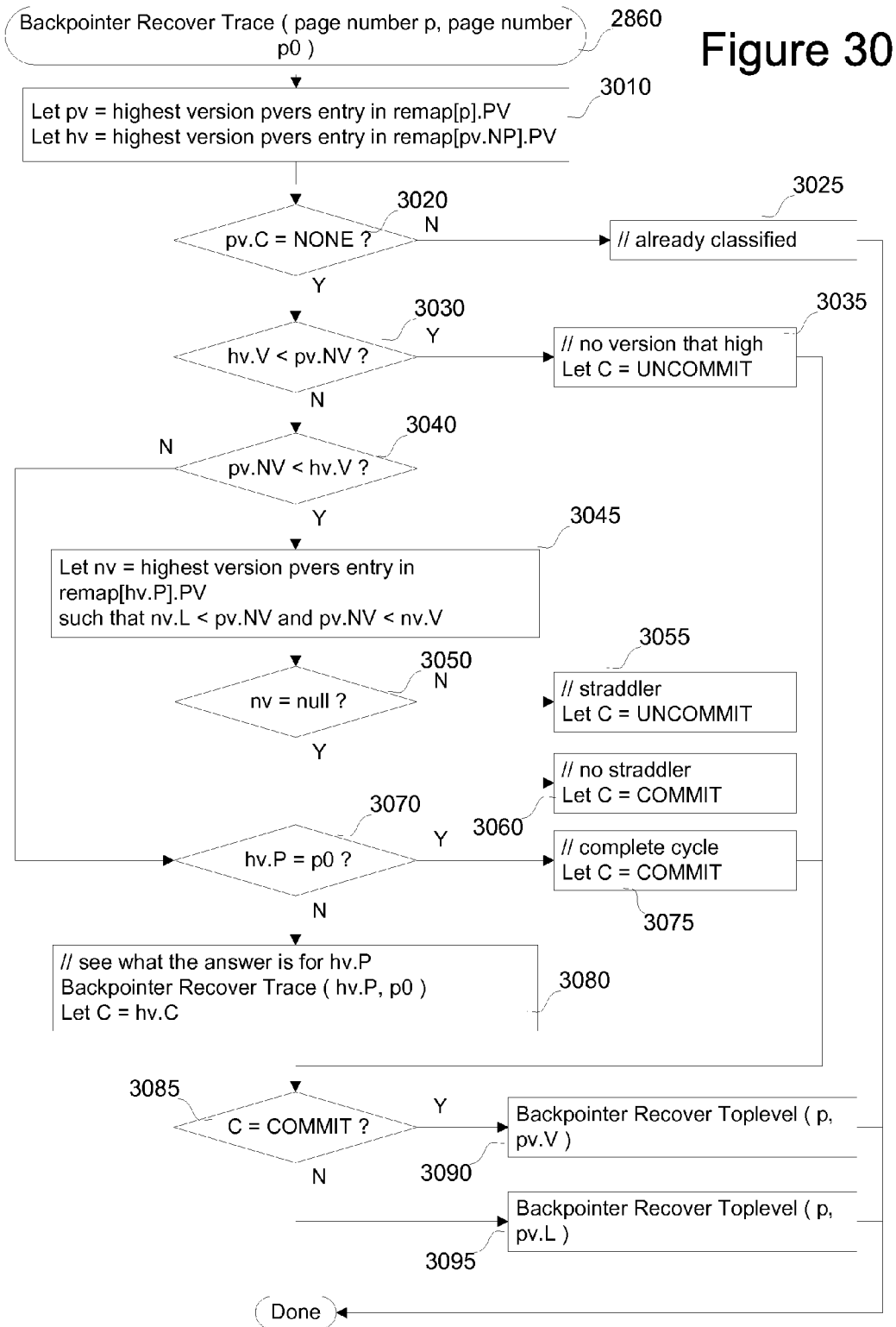
FIG. 30 is a flowchart illustrating the recovery subroutine to trace cycle links.

For each page at step 2810, the remap table entries are initialized. For each storage page s, a backpointer recover scan described with respect to FIG. 29 is performed at 2840. For each page p, a back pointer recover trace, described with respect to FIG. 30, is performed. For each page p at 2870, a backpointer recover straddle responsibility set 2880 is performed.

FIG. 29 is a flowchart illustrating the recovery subroutine 2840 to scan a storage page. At 2910, a storage page s is read from the storage device and its metadata is interpreted as an intention and related to the remap entry for the relevant page. At 2920, a determination is first made as to whether the page is a rubbed out page and if so, at 2930 the method ends. At step 2950, if the pvers entry for version is not null, a duplicate copy of the same intention as seen previously is detected and added the set of storage pages holding that intention at 2960. At step 2970, a novel intention results in allocating a new pvers entry, which is initialized from the metadata and inserted into the pvers list for the page. At 2980, the last used version numbers are updated based on the version numbers of the intention and its next pointer.

In one embodiment, instead of processing the metadata directly from the storage pages of the storage device, all of the metadata is read, sorted in order primarily by page number M.P and secondarily by version number M.V, and then processed via the scan subroutine. Encountering the metadata in sorted order makes it efficient to look up the pvers entry for a duplicate intention and to add a new pvers entry to a sorted pvers list.

FIG. 30 is a flowchart illustrating the recovery subroutine 2860 to trace cycle links. The subroutine is applied recursively in case the highest version intention links to another highest version intention. The p0 parameter indicates the outer level page in the recursive stack and is used to detect a cycle. The subroutine uses the remap table to locate the highest version pvers entry for the page and then the remap table is used again to locate the highest version pvers entry for the target page. The target page is determined from this pvers entry.

At step 3020 the commit state of the highest version pvers entry in the remap table is checked. If the state is not NONE, then the page is already classified at 3025. If the target version is higher than the highest version number on the target page at step 3030, then the classification must be "uncommitted" at step 3035. In one embodiment, the pvers lists are sorted so that it is easy to locate the highest version pvers entry.

If at step 3040 the target version is lower than the highest version number on the target page, then the classification depends on whether or not there is a straddler. In one embodiment, the pvers list is augmented with a sorted index, as discussed previously, so that finding a straddler can be performed efficiently via binary search. At step 3050, if there is a straddler, then the classification is "uncommitted" at step 3055, otherwise it is "committed" at step 3060.

If the target version equals the highest version number on the target page at step 3070, then the analysis must be applied recursively at 3080, after checking to see if a complete cycle has been traced at 3070. At step 3080 the method is applied again for the highest version on page hv.P.

At step 3085, once the classification of the highest version intention is known, then the last committed version number is known and all top-level versions on the page can be classified. The toplevel versions can then be classified using the method shown in FIG. 31 at steps 3090 or 3095 for the current version or last version, respectively.

Figure 31:
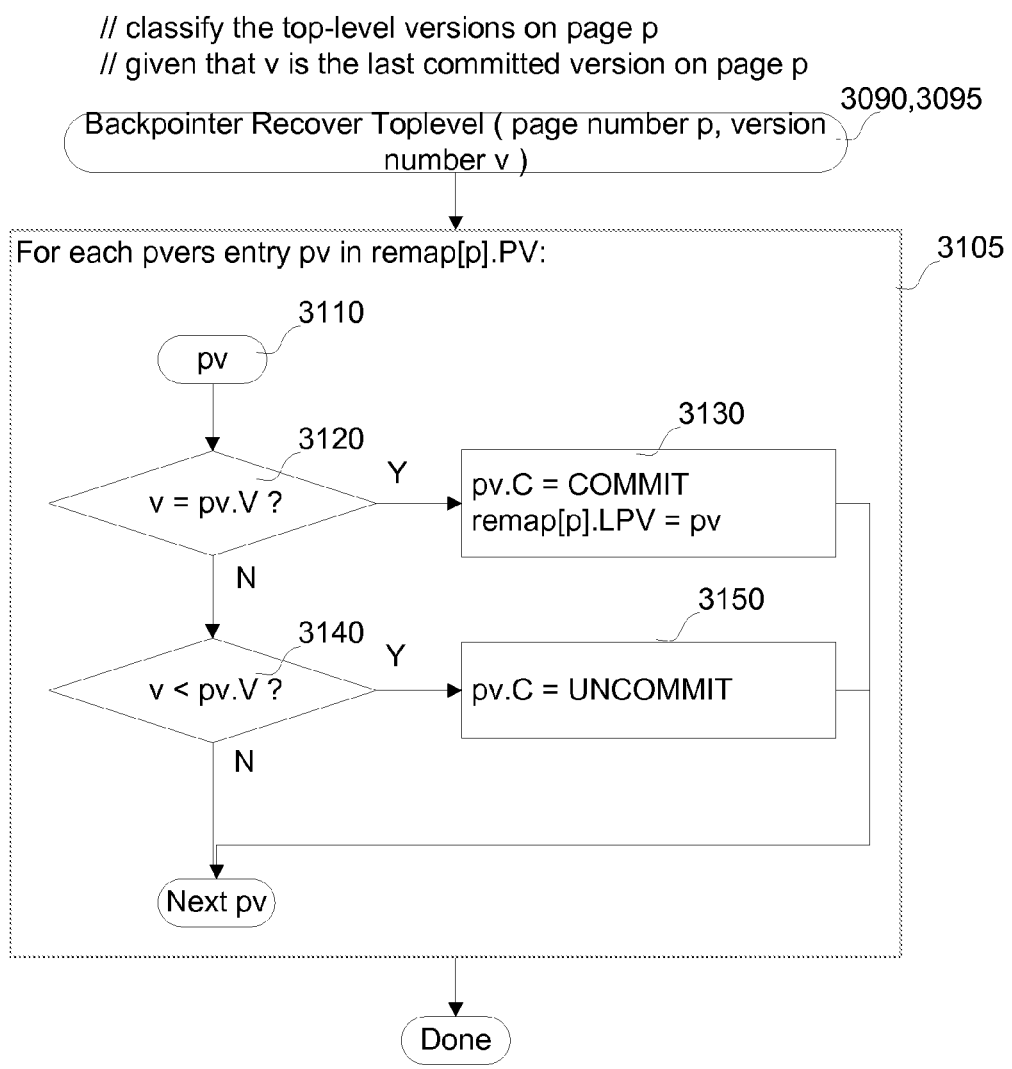
FIG. 31 is a flowchart illustrating the recovery subroutine to classify top-level versions.

FIG. 31 is a flowchart illustrating the recovery subroutine 3090, 3095 to classify top-level versions. Once the last committed version number is known for a given page, examine each pvers entry in the pvers list for that page is examined to determine if it is a top-level committed version or a top-level uncommitted version by comparing version numbers. For each pvers entry in a remap table at 3105, a determination is made at steps 3120 or 3140 of whether the entry is equal to the last committed version or greater than the last committed version. The top-level committed version is linked from the remap entry LPV field. The pvers list may sorted by version number and the list is processed from the high-order end so that only the top-level versions need to be examined.

Figure 32:
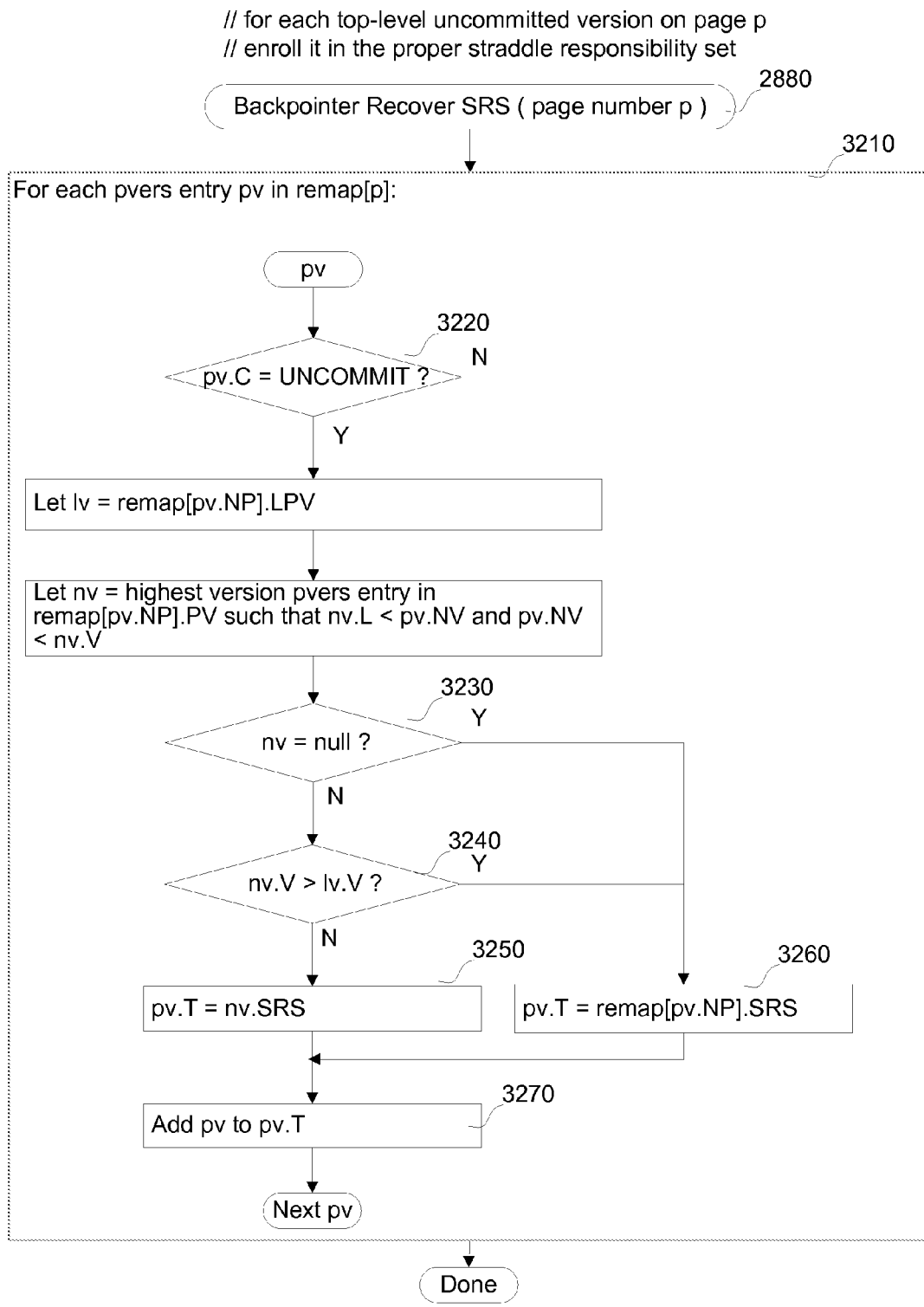
FIG. 32 is a flowchart illustrating the recovery subroutine to build straddle responsibility sets.

FIG. 32 is a flowchart illustrating the recovery subroutine to build straddle responsibility sets. Recall that only top-level uncommitted versions appear in straddle responsibility sets. The pvers list may be sorted by version number and the list processed from the high-order end so that only the top-level uncommitted versions need to be examined. The subroutine 2880 attempts to find a straddler for the target of each top-level uncommitted version. Again, the pvers list may be augmented with a sorted index, as discussed before, so that finding a straddler can be performed efficiently via binary search.

For each pvers entry in the remap entry of page p at 3220, if the commit state is UNCOMMIT then the highest version pvers entry in the remap entry is checked. If the next version entry in the pvers entry is null at step 3230, there is no straddler, or at step 3240 if the straddler is subsequent to the last committed version of the target page, then the top-level uncommitted version is added to the straddle responsibility set of the target page at 3260. Otherwise, the straddler is a designated straddler and the top-level uncommitted version is added to the straddle responsibility set of the straddler at 3250.

Each top-level uncommitted version appears in a straddle responsibility set. A non-top-level version with a non-empty straddle responsibility set cannot be garbage collected. In one embodiment, storage pages containing top-level uncommitted versions are scheduled for priority in reuse or erasure so that straddle responsibility sets will empty out rapidly. In one embodiment, during normal operation any slack time that exists will be appropriated to rub out or arrange to erase storage pages containing top-level uncommitted versions. The necessary arrangements will be obvious to those skilled in the art.

An in-progress transaction that has not written all of its intentions may be aborted at any time without requiring that other in-progress transactions also abort. The intentions that have been written become top-level uncommitted intentions and thus must appear in straddle responsibility sets. The volatile data structures must be updated to reflect this fact. The necessary arrangements will be obvious to those skilled in the art.

The present technology applies to various types of non-volatile random access storage devices. Some such devices, such as flash memory, are generally not capable of re-writing a written storage page without first subjecting the written storage page to an erasure process. Moreover, typically the erasure process cannot be applied to a single storage page in isolation but instead must target a large block of storage pages to be erased. Methods for arranging to have a large block of garbage storage pages on which to perform the erasure process are taught in the prior art. One approach is to identify a block of storage pages almost all of which are garbage and then arrange to copy the contents of the few non-garbage ones into free storage pages in another block. A notable aspect of this approach is that a failure may result in having identical copies of the same contents in multiple storage pages on the storage device.

Although flash memory typically cannot re-write a written storage page without first erasing it, typically a written storage page can be altered in such a way that the storage page can subsequently be decoded as a "rubbed-out" storage page. In this way, the contents of a storage page can be invalidated, even though the storage page cannot be reused for other data until it goes through the erasure process. Rubbing out a storage page is typically much more efficient than arranging to erase it.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of managing storage of information to non-volatile storage where storage of such information can be interrupted before completion, the method comprising:
   defining a series of to be completed write operations associated with a transaction, each write operation including a write intention that is part of a linked list including one or more write intentions;
   writing data of the write operations in respective storage pages of a non-volatile storage media, each storage page including a data page and metadata, the metadata including an identification of at least a next write intention of the linked list where the linked list defines a closed transaction cycle, and in response to a storage interruption, using the closure of the transaction cycle to indicate all write intentions of the closed transaction cycle are committed ones.

2. The method of claim 1 wherein the method further includes recovering a storage media state after one or more of to be completed write operations has been interrupted.

3. The method of claim 2 wherein each intention represents an intended update to a storage page;

said step of recovering the storage media state includes identifying a last committed intention for each page; and indicating that any intention superseded by a later version of a same committed intention to each same page may be garbage collected.

4. The method of claim 1 wherein the step of writing data includes writing the metadata so as to identify at least one of a next intention in a transaction and a last committed intention in the transaction.

5. The method of claim 1 further including a recovery method which determines a last version of a committed intention for each page and which expunges uncommitted intentions before resuming normal operation.

6. The method of claim 5 wherein the step of expunging comprises one or more of:

marking a page as invalid; altering the page to appear rubbed-out; or writing a record in a different location indicating that the transaction was aborted.

7. The method of claim 5 wherein a new intention that conflicts with the said uncommitted intentions is restricted until the said uncommitted intentions are expunged.

8. The method of claim 5 wherein storage pages containing top-level uncommitted intentions are scheduled for priority in re-use.

9. The method of claim 1 wherein an in-progress transaction may be aborted without interfering with other in-progress transactions.

10. A method of managing storage of information on non-volatile storage, comprising:

writing a series of data write operations in a transaction, each write operation including a write intention, each intention defining a storage page of a non-volatile storage media, the storage page having a data structure, the data structure including a metadata portion identifying at least a next intention in a closed transaction cycle and a data page, detecting closure of the transaction cycle and using the detected closure as an indication that all write intentions of the closed transaction cycle are committed;

determining whether a write operation is completed by determining whether the closed transaction cycle of intentions has completed; and in response to one or more of a series of write operations being interrupted, using one or more closed transaction cycles for recovering a storage media state.

11. The method of claim 10 wherein the step of using one or more closed transaction cycles for recovering includes:

determining all intentions on a storage device are committed intentions except for intentions that belong to a transaction currently in progress and said step of recovering storage device state include determining a last intention for each page; and any intention superseded by a later committed intention to each same page may be garbage collected.

12. The method of claim 10 wherein the step of writing further includes writing metadata in the page identifying a last prior committed intention in the transaction cycle.

13. The method of claim 12 wherein each next intention is a subsequent version of a page and each last prior committed intention is a previous version of the page.

14. A method of managing storage of information to non-volatile storage, where storage of such information can be interrupted before completing, the method comprising:

defining a series of write operations in a transaction, each write operation including a write intention; and writing data of the write operations in respective storage pages of a non-volatile storage media, each storage page including metadata identifying a next intention in a closed transaction cycle, the metadata also identifying a previous intention in the transaction cycle, each storage page further including page data, in response to a storage interruption, detecting closure of the transaction cycle and using the detected closure as an indication that all write intentions of the closed transaction cycle are committed; and determining whether a write operation completed by determining whether writing a closed cycle of intentions has completed.

15. The method of claim 14 wherein the metadata for each intention indicates a last prior committed intention for its page;

any uncommitted intention not part of an in-progress transaction may be garbage collected; and the method further includes determining the last committed intention for each page.

16. The method of claim 15 wherein the step of determining includes determining whether a last committed intention comprises a version of a page with at least one intervening uncommitted intention created between a later evaluated version and a last committed version, the later evaluated version comprising a straddler;

assigning a designated straddler to the at least one uncommitted intention; and maintaining a record of the designated straddler.

17. The method of claim 16 wherein any intention superseded by a later committed intention on a same page may be garbage collected provided it is not assigned as a designated straddler.

18. The method of claim 17 further including the step of releasing the designated straddler from its uncommitted intention when either:

a subsequent intention is committed on each same page as said uncommitted intention, or when said uncommitted intention is expunged.

19. The method of claim 16 further including the step of recovering a storage media state when one or more of the series of write operations is interrupted, said recovering including rebuilding top-level intention classifications;

rebuilding straddle responsibility sets; and initializing a set of free pages.

20. The method of claim 15 wherein the step of writing further includes:

associating each update intention with a version number for a page;

linking intentions comprising a transaction into a cycle; and step metadata includes the last committed version number of the page with each intention;

and the method further includes:

maintaining top level version classifications and straddle responsibility sets in volatile memory; and freeing the page of any top-level uncommitted version not part of a current transaction and any non-top level version with an empty straddle responsibility set.

\* \* \* \* \*